(12) United States Patent
Hahn et al.

(10) Patent No.: US 8,708,059 B2
(45) Date of Patent: Apr. 29, 2014

(54) MOUNTING ASSEMBLY FOR HANDLE FOR POWER TOOL

(75) Inventors: Norbert Hahn, Hünstetten-Limbach (DE); Michael Stirm, Oberursel (DE); Frantisek Harcar, Lipany (SK); Tobias Heep, Steinbach (DE); Bruno Ruethers, Bad Camberg (DE)

(73) Assignee: Black & Decker Inc., Newark, DE (US)

( * ) Notice: Subject to any disclaimer, the term of this patent is extended or adjusted under 35 U.S.C. 154(b) by 626 days.

(21) Appl. No.: 12/358,808

(22) Filed: Jan. 23, 2009

(65) Prior Publication Data

US 2009/0188692 A1 Jul. 30, 2009

(30) Foreign Application Priority Data

Jan. 24, 2008 (GB) .................... 0801311.2

(51) Int. Cl.
*B25D 1/12* (2006.01)
(52) U.S. Cl.
USPC ..................................... 173/162.2; 173/162.1
(58) Field of Classification Search
USPC .................... 173/162.1, 162.2, 201, 210, 211
See application file for complete search history.

(56) References Cited

U.S. PATENT DOCUMENTS

| | | | |
|---|---|---|---|
| 4,401,167 A | 8/1983 | Sekizawa et al. | |
| 5,522,466 A | 6/1996 | Harada et al. | |
| 5,697,456 A * | 12/1997 | Radle et al. | 173/162.2 |
| 6,076,616 A * | 6/2000 | Kramp et al. | 173/162.2 |
| 6,148,930 A * | 11/2000 | Berger et al. | 173/162.2 |
| 2005/0284646 A1* | 12/2005 | Bacila | 173/162.2 |
| 2006/0011365 A1* | 1/2006 | Stirm et al. | 173/162.2 |
| 2006/0219418 A1* | 10/2006 | Arakawa et al. | 173/162.2 |

FOREIGN PATENT DOCUMENTS

| | | |
|---|---|---|
| EP | 1882559 | 1/2008 |
| WO | WO2008034668 | 8/2007 |

OTHER PUBLICATIONS

European Search Report—dated, Aug. 12, 2011.

* cited by examiner

*Primary Examiner* — Thanh Truong
*Assistant Examiner* — Nathaniel Chukwurah
(74) *Attorney, Agent, or Firm* — Kofi Schulterbrandt; Scott B. Markow; Adan Ayala

(57) ABSTRACT

A mounting assembly for moveably mounting a handle of a power tool to a housing of the power tool is disclosed. The mounting assembly has a metal bar (324) mounted to a housing (290) of the power tool and a vibration damper (332) mounted to a handle (294) of the power tool and slidably mounted to the metal bar. The vibration damper includes a vibration damping member (344) for damping vibrations tending to cause the vibration damper to pivot relative to the metal bar about an axis substantially parallel to the longitudinal axis of the metal bar.

15 Claims, 26 Drawing Sheets

MOUNTING ASSEMBLY FOR HANDLE FOR POWER TOOL

CROSS REFERENCE TO RELATED CASES

This application claims priority, under 35 U.S.C. §119(a)-(d), to UK Patent Application No. GB 08 013 11.2 filed Jan. 24, 2008, the contents thereof to be incorporated herein by reference in its entirety.

FIELD OF THE INVENTION

The present invention relates to mounting assemblies for handles for power tools, and relates particularly, but not exclusively, to mounting assemblies for mounting handles to hammer drills such that vibrations transmitted from a main housing of the hammer drill to the handle are damped.

BACKGROUND OF THE INVENTION

A hammer drill is disclosed in U.S. Pat. No. 4,749,049 in which a handle of the hammer drill is moveably mounted to the main housing of the hammer drill and vibration damping members are placed between the handle and the housing to attenuate the transmission of vibrations from the hammer drill housing to a user's hand.

Preferred embodiments of the present invention seek to improve the damping of vibrations from the main housing of power tools to handles thereof compared with known arrangements.

BRIEF SUMMARY OF THE INVENTION

According to an aspect of the present invention, there is provided a mounting assembly for moveably mounting a handle of a power tool to a housing of the power tool, the assembly comprising:— a first mounting member adapted to be mounted to one of a housing of a power tool and a handle of the power tool;

a second mounting member adapted to be mounted to the other of the housing of the power tool and the handle of the power tool and to slidably engage the first mounting member to enable movement of the first mounting member relative to the second mounting member along a sliding axis; and at least one first vibration damping member adapted to damp vibrations tending to cause the first mounting member to pivot relative to the second mounting member about an axis substantially parallel to said sliding axis and/or to an axis substantially parallel to a longitudinal axis of the handle.

By providing at least one first vibration damping member adapted to damp vibrations tending to cause the first mounting member to pivot relative to the second mounting member about an axis substantially parallel to the sliding axis and/or to an axis substantially parallel to a longitudinal axis of the handle, this provides the advantage of further improving the vibration damping of a power tool such as a hammer drill. In particular, this enables vibrations in a direction orthogonal to the sliding axis and the longitudinal axis of the handle, caused primarily be rotation of a spindle of the power tool, to be more effectively damped.

In a preferred embodiment, said first mounting member comprises an elongate bar, said second mounting member comprises a sliding portion adapted to be slidably mounted to the bar, and at least one said first damping member comprises a first resilient member, wherein rotation of the first mounting member relative to the second mounting member about an axis substantially parallel to the sliding axis and/or to an axis substantially parallel to a longitudinal axis of the handle causes compression and/or expansion of at least one said first resilient member.

At least one said first resilient member may be tapered.

This provides the advantage of enabling a greater proportion of the resilient member to be compressed and/or expanded, thereby damping vibrations to a greater extent.

At least one said second mounting member may further comprise a mounting portion adapted to be mounted to one of the handle and the tool housing, such that pivoting of the first mounting member relative to the second mounting member about an axis substantially parallel to the sliding axis and/or to an axis substantially parallel to a longitudinal axis of the handle causes movement of the mounting portion relative to the corresponding sliding portion to cause compression and/or expansion of at least one said first resilient member.

At least one said first resilient member may be adapted to be located between the mounting portion and the corresponding said sliding portion.

At least one said mounting portion may be adapted to pivot relative to the corresponding said sliding portion.

At least one said mounting portion may be adapted to slide relative to the corresponding said sliding portion.

Said first mounting member may further comprise a stop member for limiting movement of the handle of the tool away from the housing of the tool.

The assembly may further comprise at least one second resilient member adapted to be located between said stop member and said second mounting member when said second mounting member engages said stop member.

This provides the advantage of minimising the extent to which vibrations are transmitted to a handle of the tool when the second mounting member engages the stop member.

BRIEF DESCRIPTION OF THE DRAWINGS

Preferred embodiments of the invention will now be described, by way of example only and not in any limitative sense, with reference to the accompanying drawings, in which:—

DETAILED DESCRIPTION OF THE INVENTION

Figure 1:
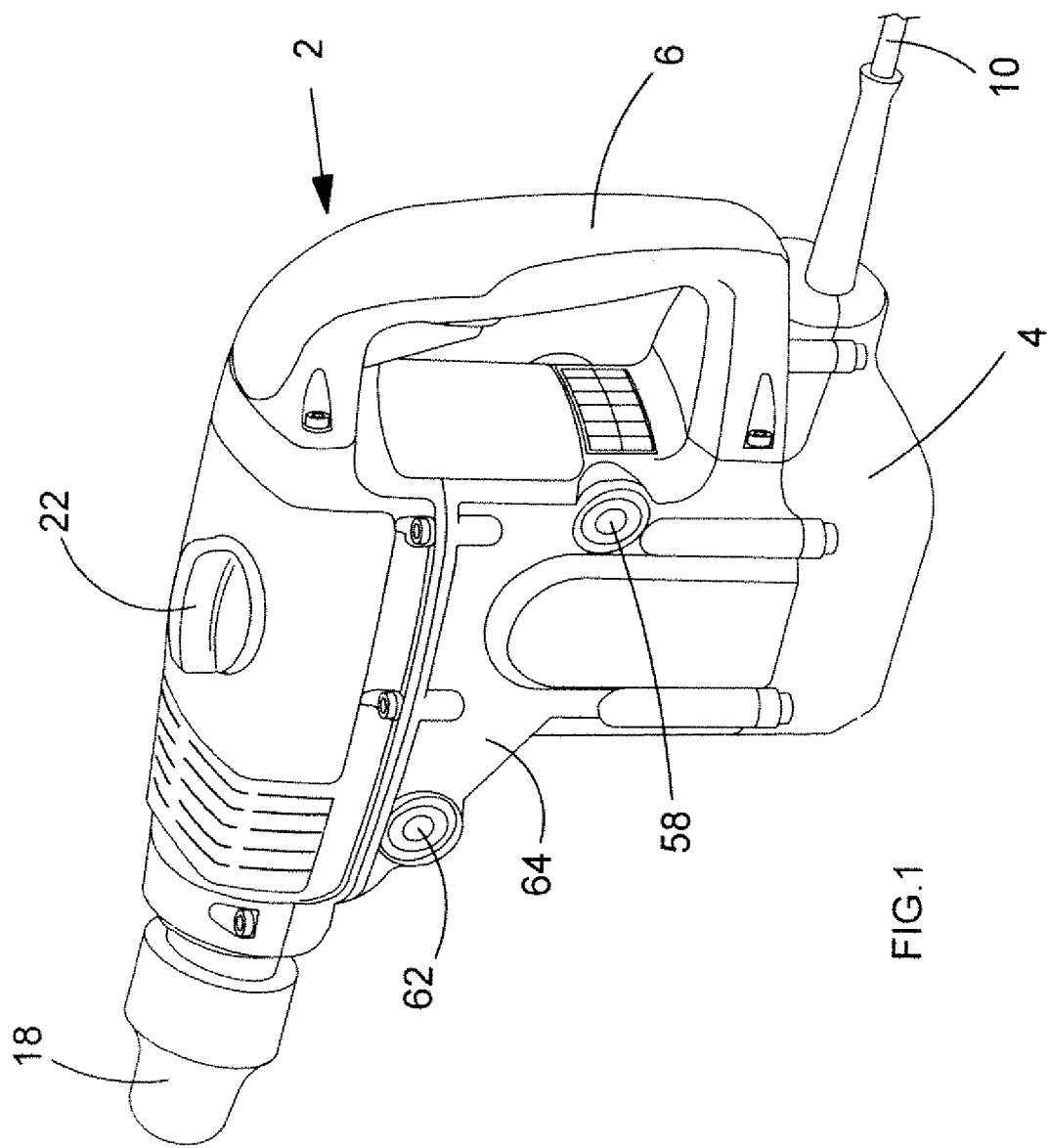
FIG. 1 is a perspective view of a hammer drill embodying the present invention.
Figure 2:
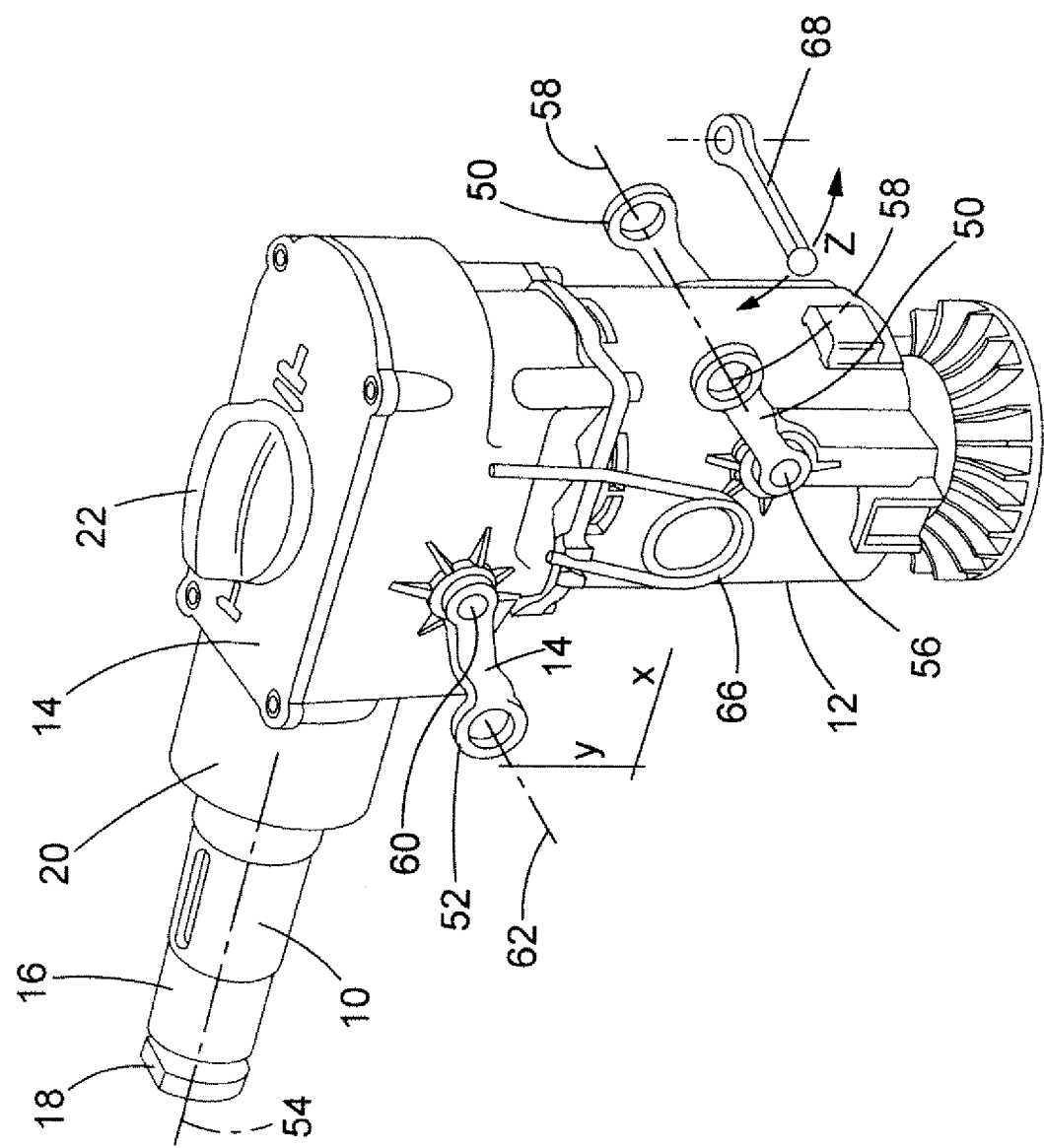
FIG. 2 is a perspective view of a transmission housing of the hammer drill of FIG. 1.

Referring to FIG. 1, a hammer drill 2 has a main housing 4 defining a rear handle 6 for gripping by a user. The rear handle 6 is provided with a trigger switch 8 for supplying electrical power from a power cable 10 to a motor 12 mounted to a lower part of a transmission housing 14, as shown in FIG. 2. The transmission housing 14 is movably mounted in the main housing 4, for reasons which will be described in greater detail below.

The motor 12 drives a spindle 16 for rotating a drill bit (not shown) mounted to a chuck 18 at a forward part of the main housing 4, and for driving a hammer mechanism 20 for imparting impacts to the drill bit. The operation of the spindle drive mechanism and hammer mechanism 20 will be familiar to persons skilled in the art and will not be described in greater detail herein.

The speed of rotation of the motor 12, and therefore the hammer frequency and speed of rotation of the spindle 16, are adjusted by rotation of a speed adjustment dial 22 rotatably mounted to an upper part of the main housing 4. As shown in greater detail in FIG. 3.

Figure 3:
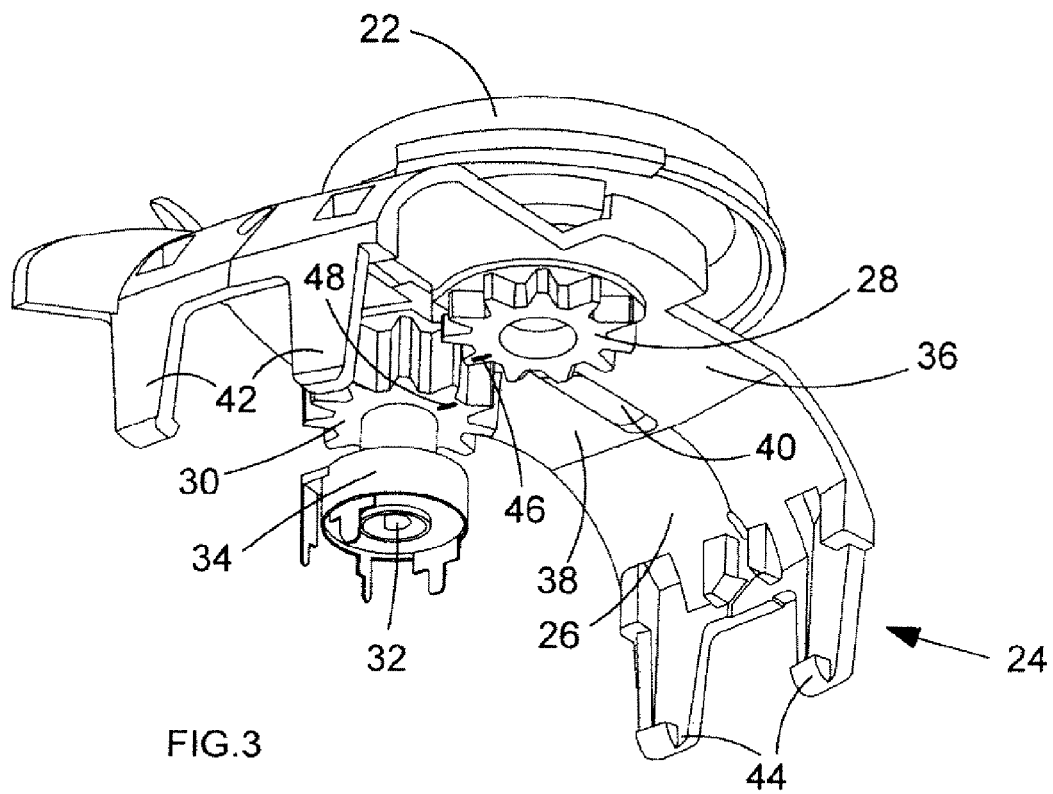
FIG. 3 is a perspective view from below of a speed adjustment dial and speed control mechanism of the hammer drill of FIG. 1.
Figure 4:
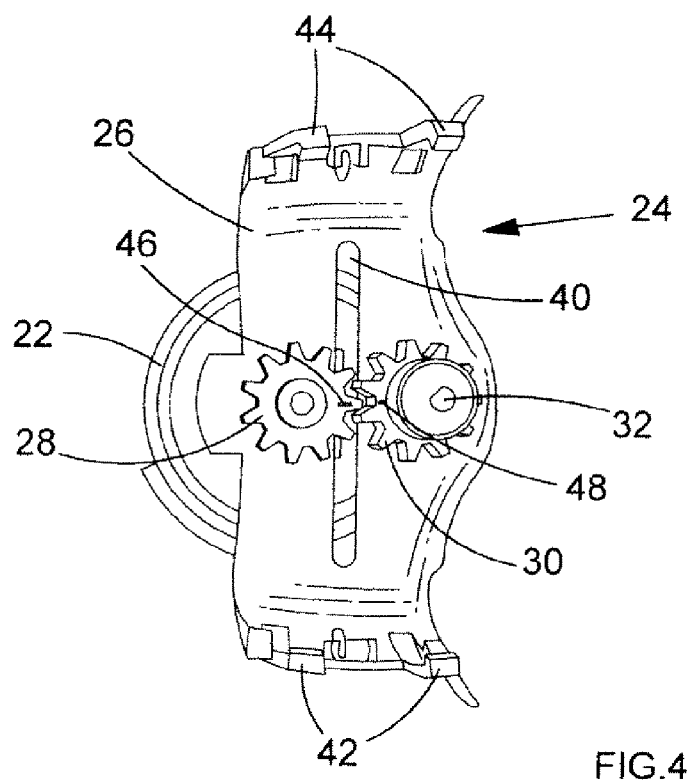
FIG. 4 is a view from below of the speed adjustment dial and speed adjustment mechanism of FIG. 3.

Referring to FIG. 3, the speed adjustment dial 22 is mounted to a speed adjustment mechanism 24 having a support 26, a first toothed gear 28 connected coaxially with the speed adjustment dial 22 for rotation therewith, and a second toothed gear 30 having an output shaft 32 having a non-circular transverse cross section in order to transfer torque from the speed adjustment dial 22 to an input of a potentiometer 34, which in turn is connected to a control circuit (not shown) for controlling the speed of rotation of the motor 12. Accordingly, by adjusting the speed control dial 22, the speed of rotation of the motor 12 can be adjusted, which in turn enables the hammer frequency and speed of rotation of the 16 spindle to be adjusted.

The support 26 is adapted to be mounted to a component (not shown) in the main housing 4 which serves to support the motor control circuit. The support 26 is formed from durable, resilient plastics material, and comprises a first limb 36, to which the first toothed gear 28 is attached, and a second limb 38, to which the second toothed gear 30 is attached. The first and second limbs 36, 38 are separated by an elongate aperture 40 so that limited flexing of the first and second limbs 36, 38 is possible (independently of each other) to enable limited movement of the first toothed gear 28 relative to the second toothed gear 30. The support 26 also comprises deformable mounting portions 42, 44 for enabling the support 26 to be resiliently mounted to the component supporting the motor control circuit, which enables easy assembly of the hammer drill 2.

The first toothed gear 28 is mounted coaxially with the speed adjustment dial 22 for rotation therewith, and meshingly engages the second toothed gear 30 such that rotation of the speed adjustment dial 22 causes rotation of the second toothed gear 30, which in turn transfers torque to the potentiometer 34, to adjust the variable resistance of the potentiometer 34 to adjust the motor speed. As shown in FIG. 3, the second toothed gear 30 is longer than the first toothed gear 28 in the direction of its axis of rotation, such that the first and second toothed gears 28, 30 remain in meshing arrangement with each other even while movement of the first toothed gear 28 relative to the second toothed gear 30 occurs as a result of relative flexing of the first and second limbs 36, 38 of the support 26.

If the user should drop the hammer drill 2 such that it lands on the speed adjustment dial 22 and an impact is transferred from the speed adjustment dial 22 to the first toothed gear 28. The first limb 36 of the support 26 can flex to a limited extent relative to the second limb 38. This enables limited movement of the first toothed gear 28 relative to the second toothed gear 38. As the length of the second toothed gear 30 is longer than that of the first toothed gear 28, the first toothed gear 28 slides along the second toothed gear 30 whilst remaining in meshing engagement with the second toothed gear 30 and without the first toothed gear 28 causing the second toothed gear 30 to move. In this way, the extent to which the impact imparted to the speed control dial 22 is transferred to the second toothed gear 30 is limited, which in turn limits the extent to which the impact is transferred to the potentiometer 34 and motor speed adjustment circuit. Accordingly, even if the impact is so great that the support 26 and/or speed adjustment dial 22 become damaged, the risk of damage to the potentiometer 34 and speed control circuit is minimised, and the speed adjustment mechanism 24 can be replaced.

The first and second toothed gears 28, 30 are provided with indicators 46, 48 respectively, which are in the form of arrows which, when aligned with each other so that the arrows point to each other, correspond to a predetermined orientation of the output shaft of the second toothed gear 30. This enables the speed adjustment mechanism 24 to be assembled correctly as the gears 28, 30 must be meshingly engaged with each other so that the indicators are capable of being aligned with each other and aids in mounting the speed control mechanism 24 to the hammer drill 2 during the manufacture or repair of the hammer drill 2, since this orientation corresponds to the output shaft 32 of the second toothed gear 30 being aligned with a predetermined orientation of the input aperture of the potentiometer 34.

Referring again to FIGS. 1 and 2, the transmission housing 14 is moveably suspended inside the main housing 4 by means of two pairs of rigid pivotable arms 50, 52 to damp the transmission of vibrations from the transmission housing 14 to the outer housing 4. As a result of the weight of the motor 12 and its location below the rotational axis 54 of the spindle 16 of the drill 2, the centre of mass of the transmission housing 14 is below the rotational axis 54 of the spindle 16. As a result, because vibrations are predominantly produced as a result of impacts of the hammer mechanism 20 along the axis 54 of the spindle 16 (in the direction of arrow X in FIG. 2), the transmission housing 14 tends to oscillate in a rotary manner about its centre of mass when vibrations propagate along the spindle 16. This causes vibrations having a vertical component, i.e. in the direction of arrow Y in FIG. 2.

The first pair of arms 50 is attached to opposed sides of the motor 12 at co-axial pivot points 56 and is attached to the outer housing 4 at co-axial pivot points 58 located near to the bottom of the handle 6. The second pair of arms 52 is attached to opposed sides of the transmission housing 14 at co-axial pivot points 60 and is attached to the outer housing 4 at co-axial pivot points 62 located at the bottom of a central region 64 of the outer housing 4. A pair of torsional springs 66 biases the transmission housing 14 forwards to counteract forces generated by the user leaning against the handle 6 and outer housing 4 when the hammer drill 2 is in use.

The length of the pivot arms 50, 52 and the location of the corresponding pivot axes 56, 58, 60, 62 are chosen to determine the path of travel of the transmission housing 14 relative to the outer housing 4. The direction of travel of the transmission housing 14 will change as it moves within the outer housing 4, the direction being substantially along the axis 54 of the spindle 16 in its foremost position and inclined relative to the axis 54 in its rearmost position.

In the early stages of drilling a hole in a workpiece (not shown), the user is concentrating on directing the tip of the tool bit (not shown), and therefore does not lean hard against the outer housing 4 of the tool 2, so as to prevent the tip of the bit from wandering. As a result, vibrations in the direction of arrow X in FIG. 2 (i.e. along the axis 54 of the spindle 16) are minimal, and vibrations in the direction of arrow Y in FIG. 2 are almost non-existent. The direction of relative motion of the transmission housing 14 relative to the outer housing 4 should therefore be along the spindle axis 54. During the early stages, the transmission housing 14 will be in its foremost position. When it is in its foremost position, the direction of movement of the transmission housing 14 is substantially in the direction of arrow X. The torsional springs 66 are relaxed and the transmission housing 14 is near its foremost position within the outer housing 4.

As drilling of the hole progresses, the user begins to lean harder against the tool bit. As the user exerts more pressure, the transmission housing 14 and motor 12 move rearwardly within the outer housing 4 against the biasing force of the springs 66. Furthermore, the rearward vibrations along the spindle axis 54 increase in reaction to the hammer action. This causes the transmission housing 14 to oscillate about its centre of mass, which in turn creates vibrations having a significant component in the direction of arrow Y in FIG. 2. The torsional springs 66 are under more tension than when the transmission housing 14 is at its foremost position, and the transmission housing 14 is near its rearmost position within the outer housing 4. The direction of travel at this stage has alter and is inclined relative to the longitudinal axis 54 of the spindle 16, as a result of which movement of the transmission housing 14 relative to the outer housing 4 damps vibrations in the directions of arrows X and Y in FIG. 2.

A laterally oriented arm 68 connecting the rear of the transmission housing 14 to the outer housing 4 enables damping of movement in a direction orthogonal to the arrows X and Y (i.e. in the direction of arrow Z in FIG. 2) to occur. This damps vibrations caused by the twisting moment of rotation of the spindle 16 when encountering obstacles in the workpiece (not shown).

Figure 5:
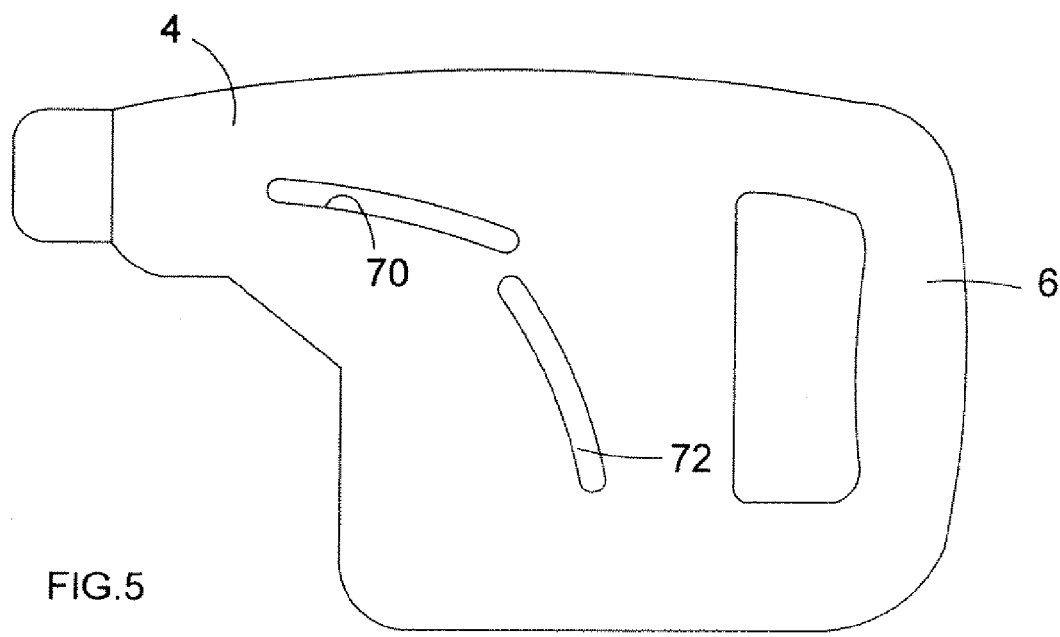
FIG. 5 is a schematic view of a clamshell of an outer housing of a hammer drill having an alternative embodiment of a vibration damping mechanism to that of the hammer drill of FIG. 1.
Figure 6:
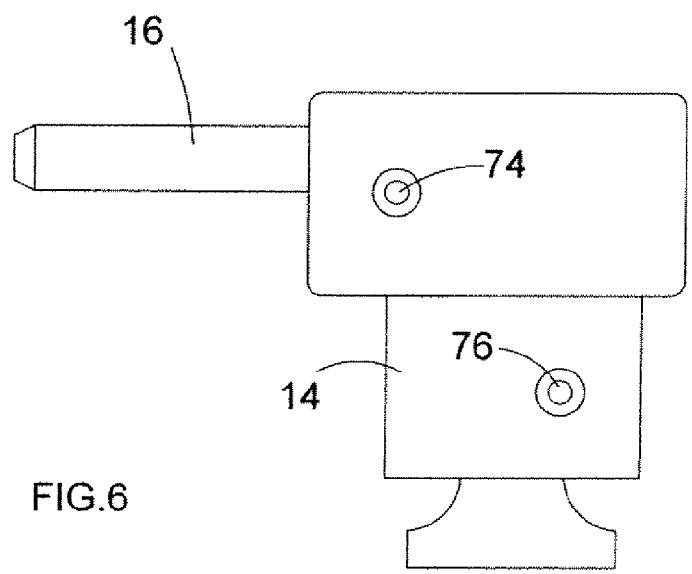
FIG. 6 is a schematic view of an alternative embodiment of transmission housing for use with the clamshell of FIG. 5.
Figure 7:
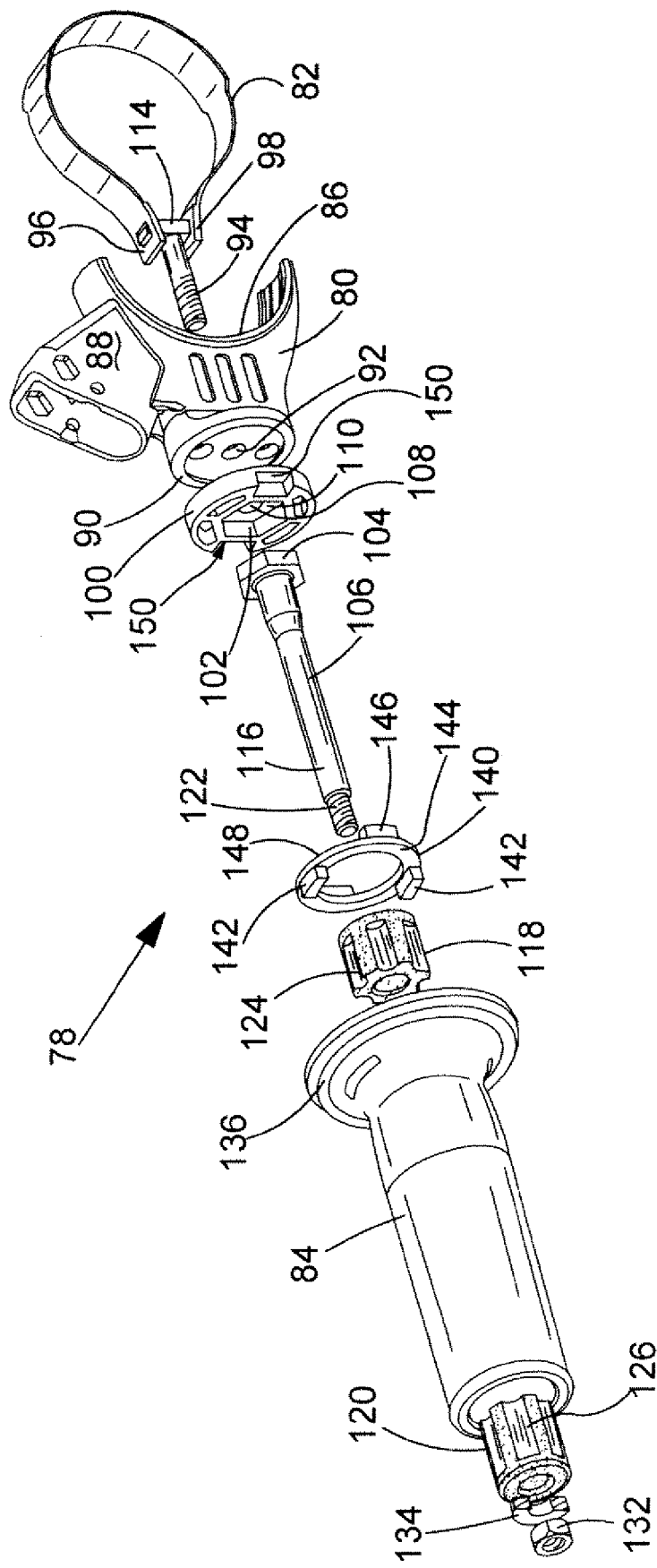
FIG. 7 is an exploded perspective view of a first embodiment of a side handle assembly for use with the hammer drill of FIG. 1.
Figure 8:
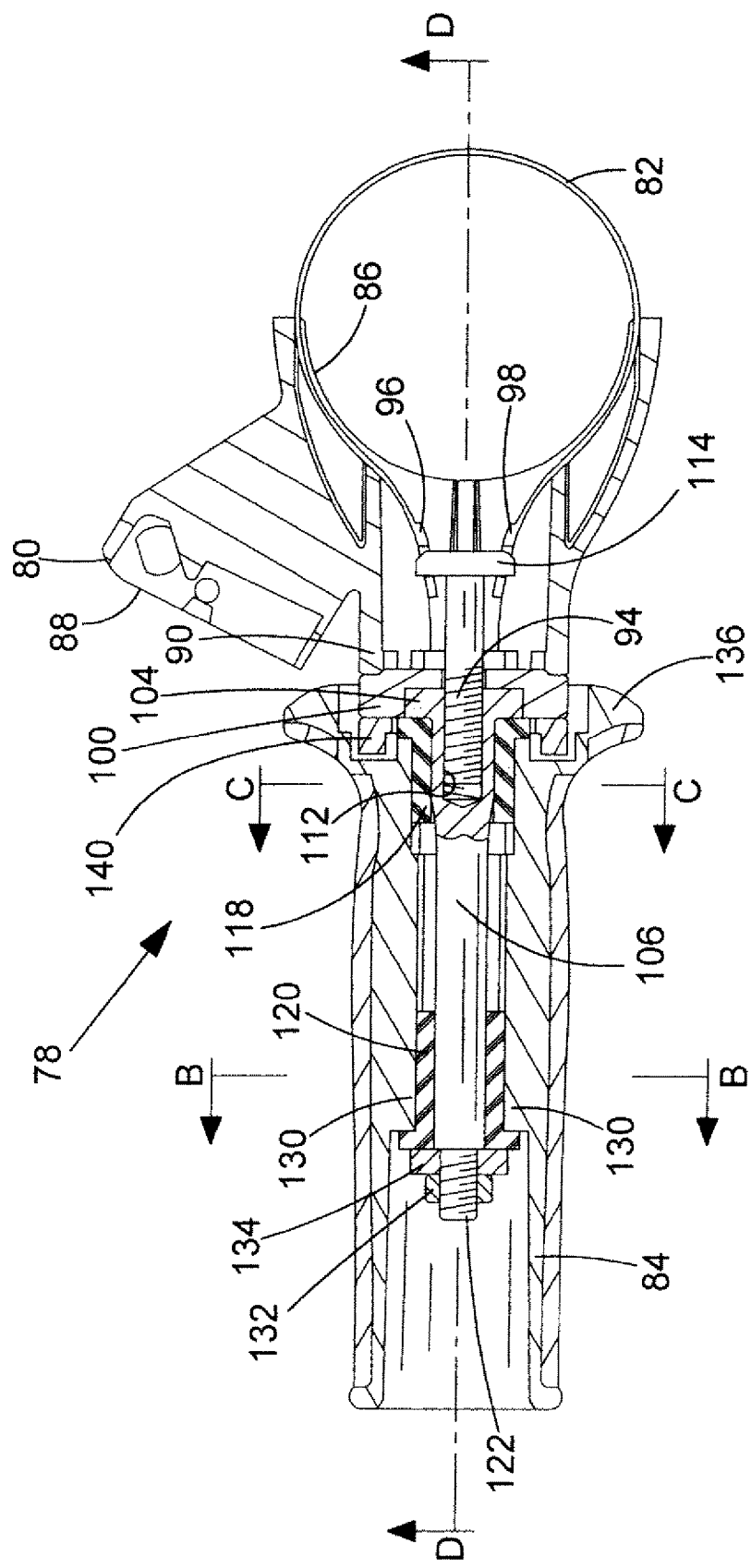
FIG. 8 is a vertical cross sectional view of the handle assembly of FIG. 7 mounted to the housing of the hammer drill of FIG. 1.
Figure 9:
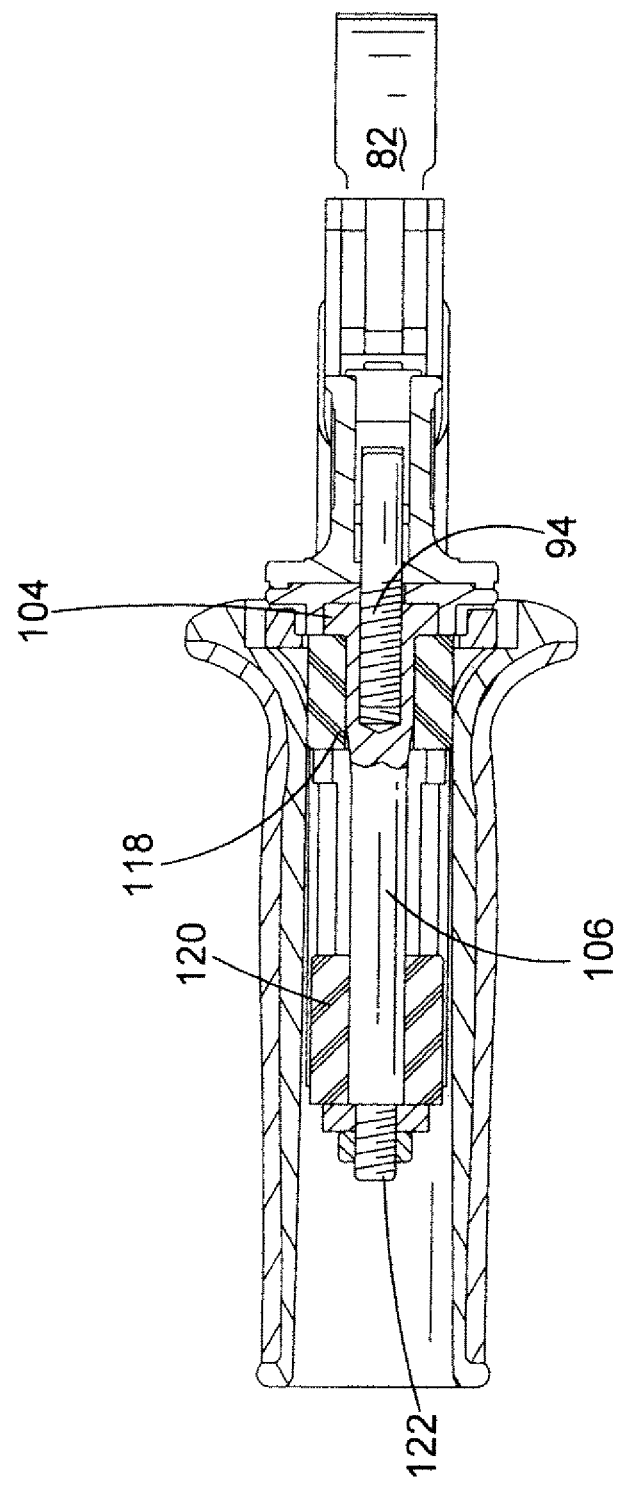
FIG. 9 is a horizontal cross sectional view of the handle assembly of FIG. 7.
Figure 12:
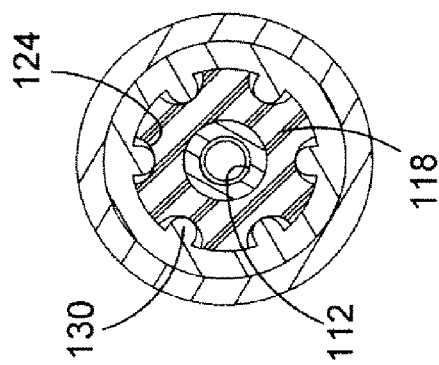
FIG. 12 is a sectional view along the line C-C in FIG. 8.
Figure 11:
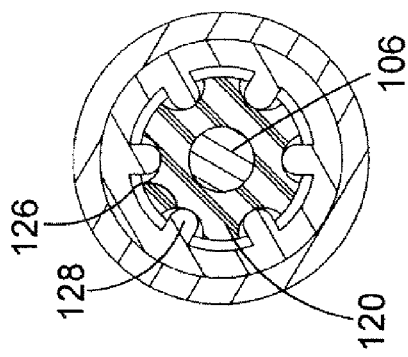
FIG. 11 is a sectional view along the line B-B in FIG. 8.
Figure 10:
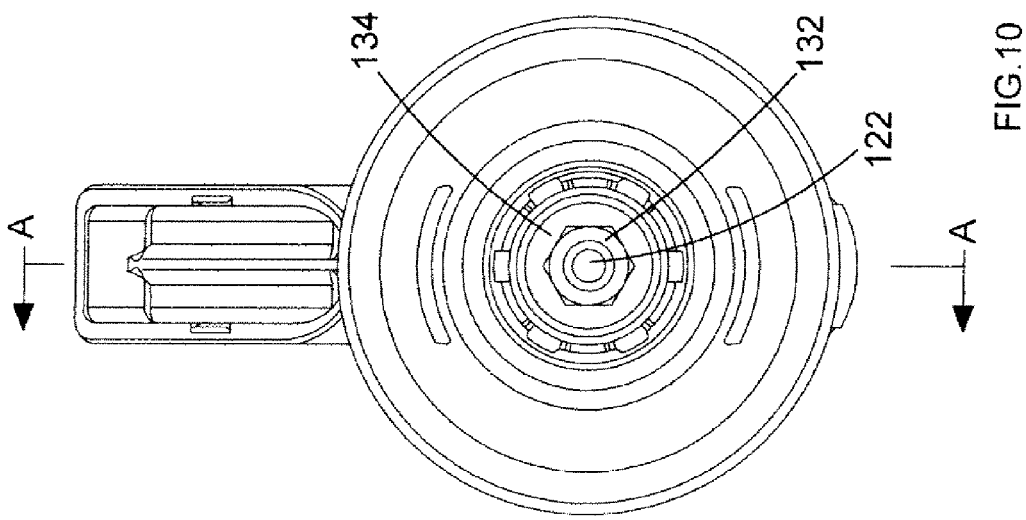
FIG. 10 is an end view of the handle assembly of FIG. 7.
Figure 13:
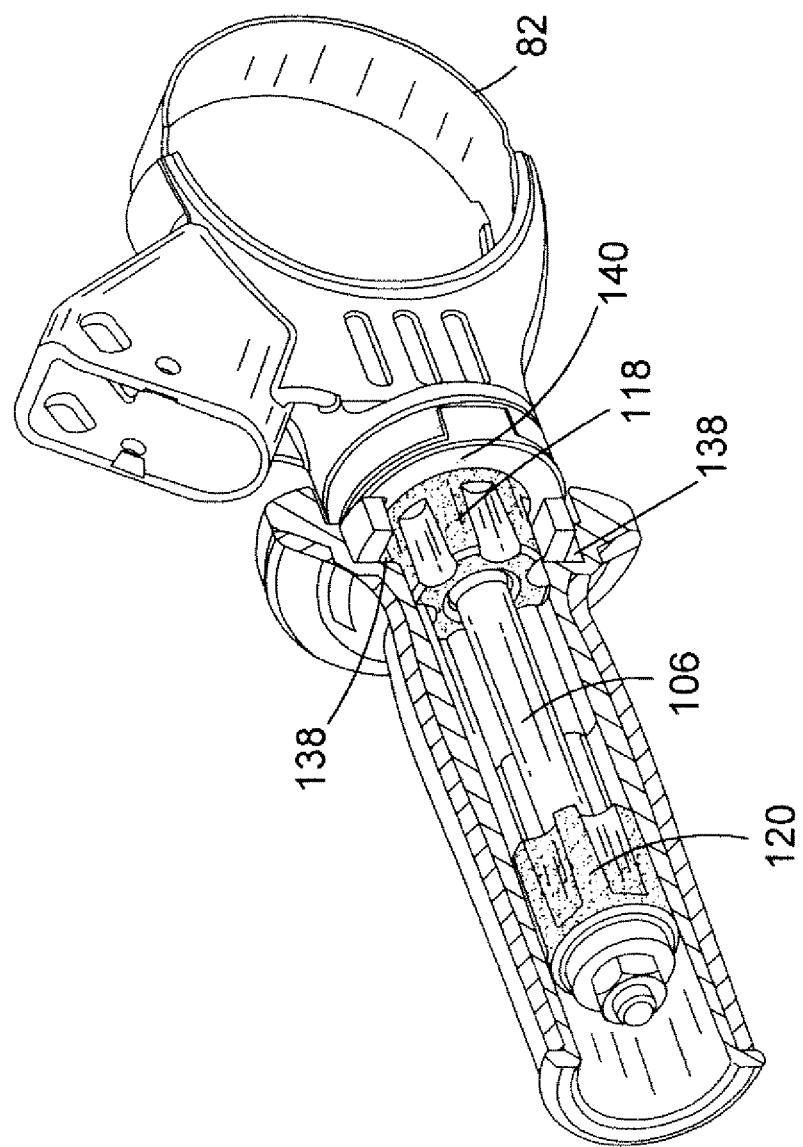
FIG. 13 is a partially cut away perspective view of the assembled handle assembly of FIG. 7.

An alternative embodiment of a vibration damping mechanism is shown schematically in FIGS. 5 and 6. The rigid pivoting arms 50, 52 are replaced by a pair of profiled cam grooves 70, 72 formed in an inner surface of the outer housing 4, which receive respective cam followers in the form of rollers 74, 76 rotatable mounted on each side of the transmission housing 14. The transmission housing 14 is biased by means of springs (not shown) towards its foremost position relative to the outer housing 4, in a manner similar to the embodiment of FIGS. 1 and 2. The profile of the cam grooves 70, 72 is chosen such that as a user applies force to the outer housing 4 while drilling a hole, the rollers 74, 76 move along the cam grooves 70, 72 respectively to adjust the orientation of the transmission housing 14 relative to the outer housing 4 so that the direction of relative motion of the transmission housing 14 relative to the outer housing 4 can be closely matched to the resultant direction of vibrations transmitted from the transmission housing 14 to the outer housing 4.

Referring to FIGS. 7 to 13, a handle assembly 78 for attachment to the hammer drill 2 of FIG. 1 has a support in the form of a base 80 of durable plastics material, a mounting part comprising a flexible strip 82 of metal for mounting the handle assembly 78 to a forward part of the outer housing 4, and a handle 84 of suitable resilient material for gripping by a user.

The base 80 has a part-circular portion 86 for abutting the side of a front part of the outer housing 4 of the hammer drill 2, and a socket 88 formed at its upper side for location of a depth stop mechanism (not shown), the function of which will be familiar to persons skilled in the art, and will therefore not be described in further detail herein. A generally circular platform 90 is formed on one side of the base 80, and is provided with a hole 92 for receiving a threaded rod 94 connected to the two ends 96, 98 of the metal strip 82 which is formed into a loop.

A support 100 of durable plastics material is mounted to the platform 90 and has a recess 102 of hexagonal shape for receiving a hexagonal head 104 of an elongate metal bolt 106 so that the bolt 106 is prevented from rotating relative to the support 100. A hole 108 is formed through a base 110 of the recess 102 for alignment with the hole 92 in the platform 90 in order to receive the threaded rod 94. An axial threaded internal passage 112 (FIG. 8) is provided in the elongate bolt 106 to enable the threaded rod 94 to be screwed into the threaded passage 112, the entrance to the passage 112 being provided in the head 104 of the bolt 106 facing the support 100.

The end 114 of the threaded rod 94 facing away from the platform 90 is connected to the two ends 96, 98 of the metal strip 82, which is formed into a loop, such that the metal strip 82 can be loosely wrapped around the front part of the outer housing 4 of the hammer drill 2. The metal strip 82 is prevented by the housing 4 from rotating relative to the base 80, as a result of which the threaded rod 94 is prevented from rotating relative to the base 80. As a result, rotation of the elongate bolt 106 relative to the base 80 causes the threaded rod 94 to move axially relative to the tubular passage 112 in the elongate bolt 106, to either draw the threaded rod 94 through the holes 92, 108 in the platform 90 and support 100 into the threaded rod 106 to tighten the metal strip 82 around the outer housing 4, or to cause the threaded rod 94 to move out of the passage 112 to loosen the metal strip 82 around the housing 4. The support 100 is located in position by being sandwiched between the head 104 of the elongate bolt 106 and the platform 90 on the base 80.

The handle 84 is formed from durable plastics material and is rotatably mounted to the shank 116 of the elongate bolt 106 by means of two resilient rubber dampers 118, 120. The first damper 118 is mounted on the shank 116 of the bolt 106 adjacent the head 104, and the second damper 120 is mounted on the shank 116 of the bolt 106 at the end 122 of the shank 116 remote from the head 104. The dampers 118, 120 are non-rotatably mounted to the handle 84 by means of grooves 124, 126 formed on the outer surface of the dampers 118, 120 respectively, which engage respective ridges 128, 130 (FIGS. 11 and 12) on the inside of the handle 84. The first damper 118 is held in place by being sandwiched between the support 100 and the head 104 of the bolt 106 on one side, and the ridges 128 on the other side. The second damper 120 is held in place by being sandwiched between a nut 132 and washer 134 screwed onto the end 122 of the shank 116 of the bolt 106 and the ridges 130 on the internal surface of the handle 84. Limited axial movement of the handle 84 relative to the bolt 106 is possible as a result of compression of the dampers 118,120, as is limited pivoting of the handle 84 about an axis perpendicular to the longitudinal axis of the bolt 106.

The handle 84 is provided with a radially extending flange 136 formed at its end adjacent the support 100. The flange 136 is provided with a pair of recesses 138 (FIG. 13) located on diametrically opposite sides of the longitudinal axis of the handle 84. A locking ring 140 of durable plastics material is sandwiched between the flange 136 and the support 100. The locking ring 140 is provided with a pair of diametrically opposite first pegs 142 on a first face 144 for location in the respective recesses 138 in the flange 136, the circumferential extent of the pegs 142 being less than that of the recesses 138 in the flange 136 to allow limited pivoting movement around the longitudinal axis of the bolt 106 of the handle 84 relative to the locking ring 140.

The locking ring 140 is also provided with a pair of diametrically opposite second pegs 146 located on a second face 148 of the locking ring 140, opposite to the first pegs 142. The second pegs 146 are offset by generally 90 degrees relative to the first pegs 142 and engage a pair of recesses 150 formed on diametrically opposite sides of the plastic support 100. The circumferential extent of the second pegs 146 is less than that of the recesses 150 to permit limited pivotal movement of the locking ring 140 around the longitudinal axis of the bolt 106 relative to the support 100. Springs (not shown) can be provided (though not required) in the recesses 138 on the flange 136 and/or in the recesses 150 in the support 100 to bias the first and second pegs 142, 146 towards the centre of the corresponding recesses 138, 150 respectively.

It can therefore be seen that limited rotation of the handle 84 relative to the base 80 is possible, but beyond predetermined limits, torque is transmitted from the handle 84 via the locking ring 140 to the support 100, which in turn causes rotation of the elongate bolt 106 relative to the threaded rod 94 to either tighten or loosen the metal strip 82 around the outer housing 4 of the hammer drill 2.

Figure 14:
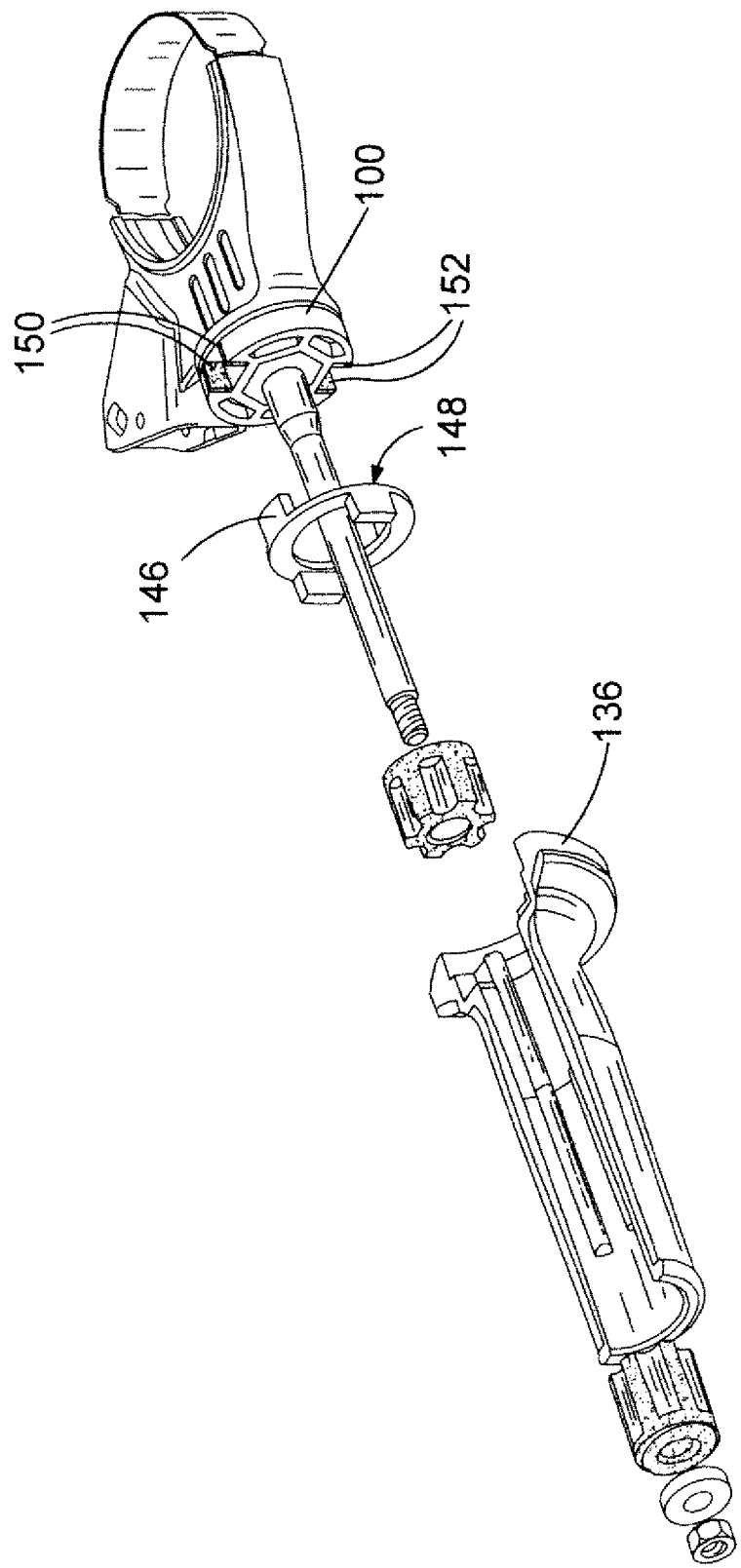
FIG. 14 is an exploded view of a handle assembly of a second embodiment of the side handle assembly.

A second embodiment of a side handle assembly embodying the present invention is shown in FIG. 14, in which pairs of resilient vibration damping members 152 are provided in the recesses 150 in the support 100. Similar vibration damping members (not shown) can be provided in the recesses 138 on the flange 136 of the handle 84.

Figure 15:
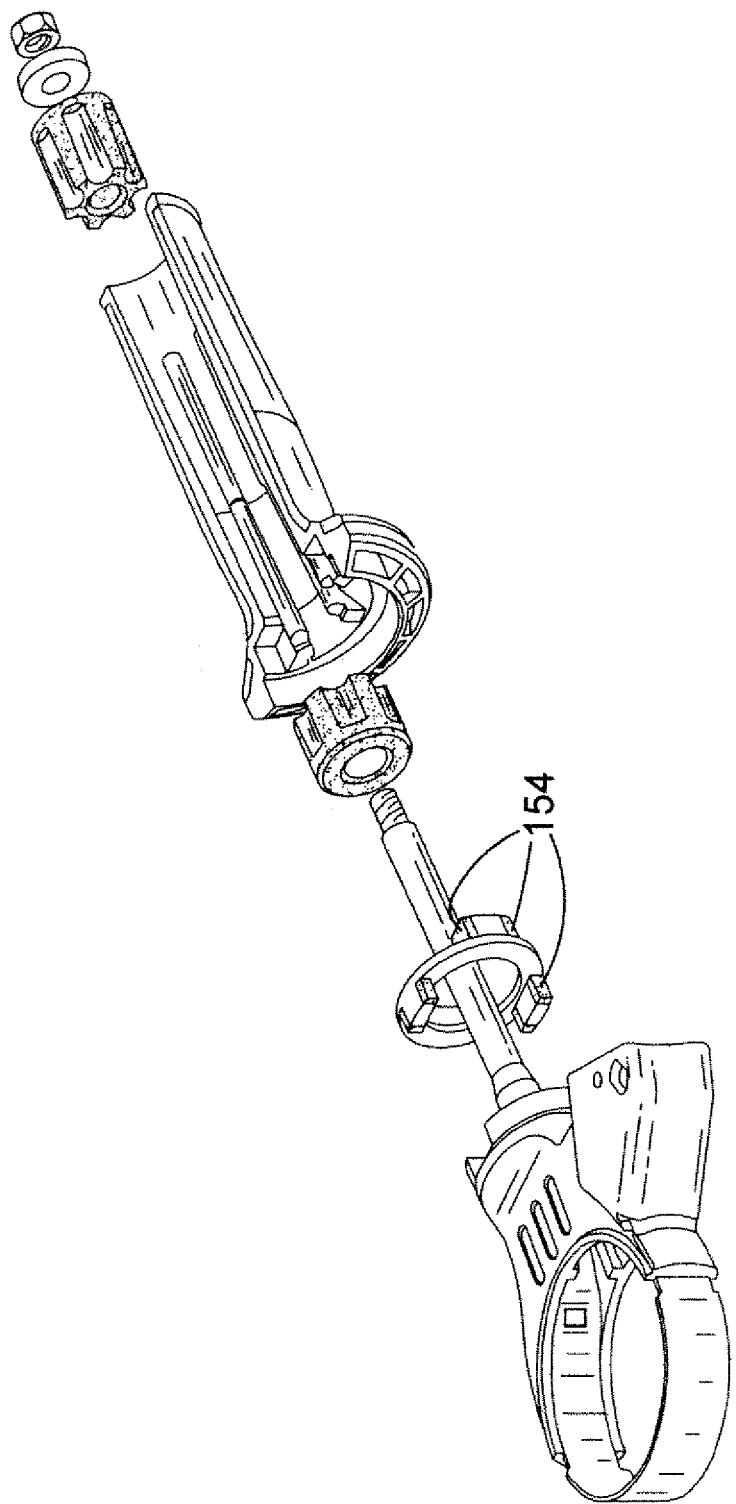
FIG. 15 is an exploded view of a handle assembly of a third embodiment of the side handle assembly.

A third embodiment of a side handle assembly embodying the present invention is shown in FIG. 15, in which pairs of resilient vibration damping members 154 are provided on the first and second pegs 142, 146 on the locking ring 140.

Figure 16:
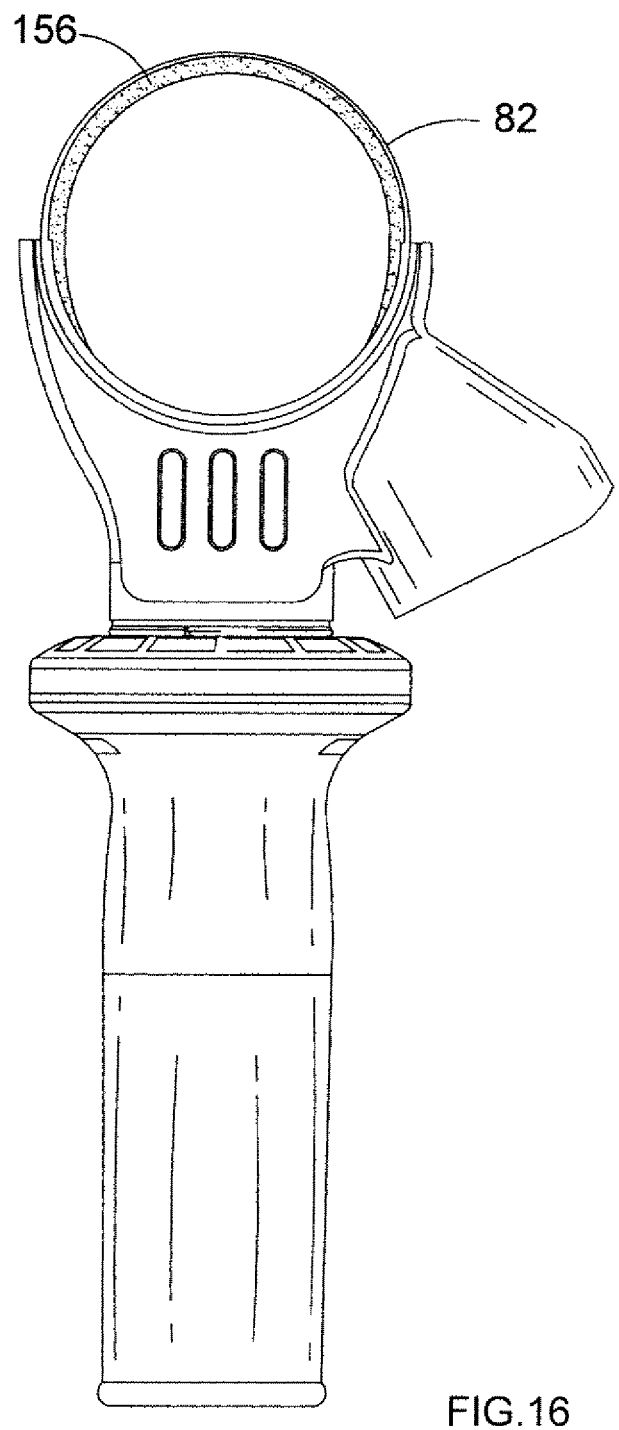
FIG. 16 is a side view of a handle assembly of a fourth embodiment of the side handle assembly.

A fourth embodiment of a side handle assembly embodying the present invention is shown in FIG. 16, in which a strip 156 of resilient material is provided on the inner surface of the metal strip 82, in order to damp vibrations transmitted from the outer housing 4 of the hammer drill 2 to the metal strip 82.

Overload Clutch Assembly

A known two torque clutch connected between a motor output shaft and a spindle drive of the hammer drill of FIG. 1 is disclosed in WO 2004/024398. A similar clutch will now be described in more detail with reference to FIGS. 17 to 19.

A bevel gear 158 which forms part of the clutch arrangement is integrally formed with a shaft 160 of circular cross section. The upper end of the shaft 160 is rotatably mounted within the housing 4 of the hammer via a bearing comprising an inner race 162 which is rigidly attached to the shaft 160, an outer race 164 which is rigidly attached to the housing and ball bearings 166 which allow the outer race 164 to freely rotate about the inner race 162. The bearing is located adjacent the underside of the bevel gear 158.

A driving gear 168 connected to an output shaft of the motor 12 is rotatably mounted on the shaft 160 and can freely rotate about the shaft 160. The driving gear 168 abuts the underside of the inner race 162 of the bearing and is prevented from axially sliding away from (downwardly) by the rest of the clutch mechanism which is described in more detail below.

The driving gear 168 is so shaped that it surrounds a toroidal space, the space being surrounded by a flat bottom 170 which projects radially outwards from the shaft 162, an outer side wall 172 upon the outer surface of which are formed the teeth of the driving gear 168 and an inner side wall 174 which is adjacent the shaft 160.

Located within the toroidal space of the driving gear 168 adjacent the flat bottom 170 is a washer 176 which surrounds the inner wall 174 and shaft 160. Mounted on top of the washer 176 is belleville washer 178. The inner edge of the belleville washer 178 is located under the inner race 162 of the bearing whilst the outer edge of the belleville washer 178 abuts against the outer edge of the washer 176 adjacent the outer wall 172 of the driving gear 168. The driving gear 168 is held axially on the longitudinal axis of the shaft 160 in relation to the belleville washer 178 so that the belleville washer 178 is compressed causing it to impart a downward biasing force onto the washer 176 towards the flat bottom 170 of the driving gear 168.

Formed in the flat bottom 170 of the driving gear 168 are two sets of holes; a first inner set 180 of five, each located equidistantly from the longitudinally axis of the shaft 160 in a radial direction and angularly from each other around the longitudinal axis of the shaft 160; a second outer set 182 of five, each located equidistantly from the longitudinal axis of the shaft 160 in a radial direction and angularly from each other around the longitudinal axis of the shaft 160. The radial distance of the outer set 182 from the longitudinal axis of the shaft 160 is greater than that of the inner set 180.

A ball bearing 184 is located in each of the holes 180, 182 and abuts against the underside of the washer 176. The diameters of all the ball bearings 184 are the same, the diameter being greater than the thickness of the flat bottom 170 of the driving gear 168 thereby resulting either the top or bottom of the ball bearings 184 protruding beyond the upper or lower surfaces of the flat bottom 170 of the driving gear 168.

Mounted on the shaft 160 below and adjacent to the driving gear 168 is a first slip washer 186. The first slip washer 186 comprises a circular hole with two splines 188 projecting into the hole which, when the washer 186 is mounted on the shaft 160, locate within two corresponding slots 190 formed in the shaft 160. As such, the first slip washer 186 is non-rotatably mounted on the shaft 160, the shaft 160 rotating when the first slip washer 186 rotates.

Formed on one side of the first slip washer 186 around the periphery is a circular trough 192 with a U shaped cross section. The circular trough 192 is separated into five sections, the depth of each section of trough varying from a low point to high point. Each section of trough is the same in shape as the other sections of trough. The low point of one section of trough is adjacent to the high point of the next section. The two are connected via a ramp. When the slip washer 186 is mounted on the shaft 160, the side of the first slip washer 186 faces the driving gear 168. The diameter of the first slip washer 186 is less than that of the driving gear 168 and is such that, when the slip washer 186 is mounted on the shaft 160, the trough 192 faces the inner set of holes 180. The five sections which form the trough 192 correspond to the five holes 180 which formed the innermost set of holes in the driving gear 168 so that, when the clutch is assembled, one ball bearing 184 locates in each section of the trough 192.

Figure 17:
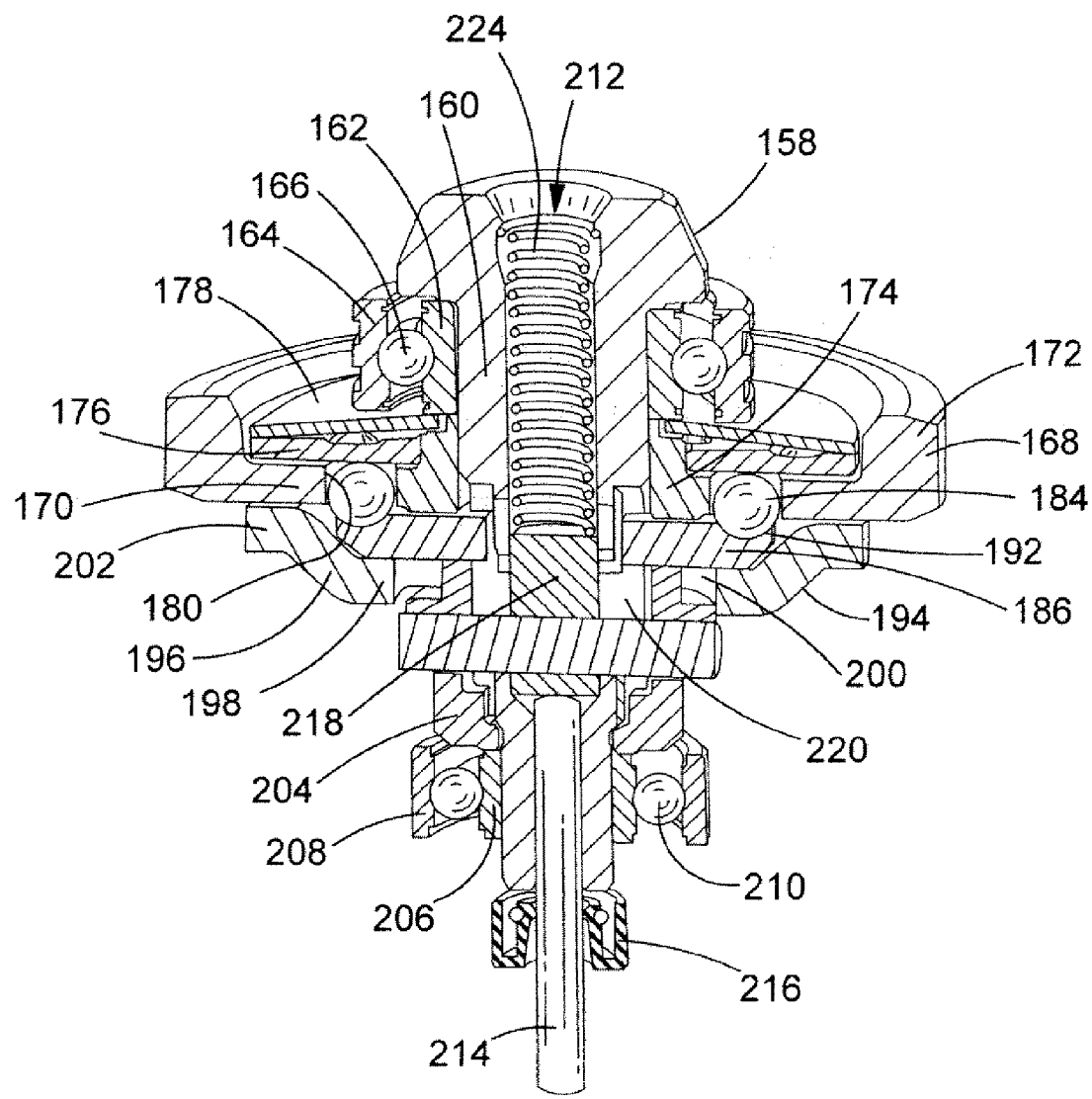
FIG. 17 is a side cross sectional view of a known two torque overload clutch of the hammer drill of FIG. 1.

Mounted on the spindle shaft 160 below the first slip washer 186 is a second slip washer 194. The second slip washer 194 is dish shaped having an angled side wall 196 surrounding a flat base 198. When mounted on the shaft 160, the first slip washer 186 locates within the space surrounded by the side wall 196 and the flat base 198 surface as best seen in FIG. 17. The second slip washer 194 can freely rotate about the spindle shaft 160. A rectangular slot 200 superimposed on a circular hole is formed in the flat base 198 symmetrical about the axis of rotation of the second slip washer 194. Formed on the top of the angled side wall 196 is a flange 202 which projects radially outwards.

Formed on the top side of the radial flange 202, around the radial flange 202, is a circular trough (not shown) with a U shaped cross section which is similar in shape to that on the first slip washer 186. The circular trough is separated into five sections, the depth of each section of trough varying from a low point to a high point. Each section of the trough is the same in shape as the other sections of trough. The low point of one section of trough is adjacent to the high point of the next section. The two are connected via a ramp. When the second slip washer 194 is mounted on the shaft 160 as shown, the side of the flange 202 with the trough faces the driving gear 168. The diameter of the flange 202 is such that, when the second slip washer 194 is mounted on the shaft 160, the trough faces the outer set of holes 182 in the driving gear 168. The five sections which form the trough correspond to the five holes 182 which form the outermost set of holes in the driving gear 168 so that, when the clutch is assembled, one ball bearing 184 locates in each section of the trough.

The size of the ramps in the trough 192 of the first slip washer 186 is less than that of the size of the ramps formed in the trough of the second slip washer 194, the variation of the height of each section of trough in the first slip washer 186 from the low end to the high end being less than that of the variation of the height of each section of trough in the second slip washer 194 from the low end to the high end.

When the clutch is assembled, the ball bearings 184 in the innermost set of holes 180 in the driving gear 168 locate within the trough 192 of the first slip washer 186 (one ball bearing per section) and the ball bearings 184 in the outer most set of holes 182 in the driving gear 168 locate within the trough of the second slip washer 194 (one ball bearing per section).

A circular clip 204 is rigidly mounted on the shaft 160 below the second slip washer 194 which holds the first and second slip washers 186, 194 together with the driving gear 168 against the underside of the bearing in a sandwich construction preventing axial displacement of the three along the shaft 160. Rotation of the circular clip 204 results in rotation of the shaft 160.

The lower end of shaft 160 is rotatably mounted within the housing 4 of the hammer via a second bearing comprising an inner race 206 which is rigidly attached to the shaft 160, an outer race 208 which is rigidly attached to the housing 4 and ball bearings 210 which allow the outer race 208 to freely rotate about the inner race 206. The bearing is located adjacent the underside of the circular clip 204.

When the clutch is fully assembled and no rotary torque is being transferred through it, each of the ball bearings in the innermost holes 180 of the driving gear 168 locate in the lowest points of the corresponding sections of the trough 192 in the first slip washer 186. When the ball bearings 184 are located within the lowest points of the sections of the trough 192, the tops of the ball bearings 184, which are adjacent to the washer 176, are flush with the surface facing the washer 176 of the flat bottom 170 of the driving gear 168. The ball bearings 184 locate in the lowest points due to the biasing force of the belleville washer 178 which is biasing the washer 176 in a downward direction which in turn pushes the ball bearings 184 to their lowest positions.

Similarly, when the clutch is fully assembled and no rotary torque is being transferred through it, each of the ball bearings 184 in the outermost holes 182 of the driving gear 168 locate in the lowest points of the corresponding sections of the trough in the second slip washer 194. When the ball bearings 184 are located within the lowest point of the sections of the trough, the tops of the ball bearings 184, which are adjacent to the washer 176, are flush with the surface of the flat bottom 170 of the driving gear 168 facing the washer 176. The ball bearings 184 locate in the lowest points due to the biasing force of the belleville washer 178 which is biasing the washer 176 in a downward direction which in turn pushes the ball bearings 184 to their lowest positions.

Formed through the length of the shaft 160 is a tubular passageway 212. Located within the lower section of the tubular passageway 212 is a rod 214. The rod 214 projects below the shaft 160 beyond the shaft 160. A seal 216 is attached to the base of the shaft 160 and surrounds the rod 214. The seal 216 prevents the ingress of dirt.

Adjacent to the upper end of the rod 214 is a sleeve 218. The end of the rod 214 is held against the sleeve 218 by a cam 228 which is described in more detail below. Projecting in opposite directions perpendicularly to the sleeve 218 are two pegs 220. The sleeve 218 is located within the shaft 160 in a position along the length of the shaft 160 where the sleeve 218 and pegs 220 are surrounded by the circular clip 204. Two vertical slots 222 are formed in the sides of the circular clip 204. The top end of the slots 222 extends to the top of the circular clip 204. The bottoms of the slots 222 extend part way down the circular clip 204, terminating in a base. In each of the slots 222 is located one of the pegs 220. The pegs 220 extend through the slots on the shaft 160 and the circular clip 204. The rod 214, together with the sleeve 218 and two pegs 220 can vertically slide up and down. The lowest position is where the two pegs 220 abut the bottom of the slots 222 of the circular clip 204, further downward movement being prevented by the base of the slots 222 in the circular clip as shown in FIG. 17. The highest position is where the two pegs 220 locate within the rectangular slot 200 within the second slip washer 194 in addition to being located within the top end of the slot 190, further upward movement being prevented by the underside of the first slip washer 194. A spring 224 locates between the top of the shaft 160 and the sleeve 218 in the upper section of the tubular passageway 212. The spring 224 biases the sleeve 218, two pegs 220 and rod 214 towards their lowest position. Regardless of whether the pegs 220 are at their upper or lower position, rotation of the pegs 220 results in rotation of the circular clip 204 due to the pegs 220 being located in the slots 222 which in turn results in rotation of the shaft 160.

Movement of the rod 214 between its lowest and highest position changes the clutch from a low torque to a high torque clutch. The mechanism by which the rod 214 is moved vertically is described below. The clutch operates by transferring the rotary movement from the driving gear 168 to the bevel gear 158 which is integral with the shaft 160. When the torque across the clutch is below a predetermined value the driving gear 168 will rotatingly drive the bevel gear 158. When the torque across the clutch is above a predetermined value the driving gear 168 will rotate but the bevel gear 158 will remain stationary, the clutch slipping as the driving gear 168 rotates. The predetermined value of the torque at which the clutch slips can be alternated between two preset values by the sliding movement of the rod 214 between the lowest and highest positions.

The mechanism by which the clutch works will now be described.

The rod 214 is located in its lowest position when the clutch is acting as a low torque clutch. When in this position, the pegs 220 are disengaged from the rectangular aperture 200 in the second slip washer 194. As such, therefore, the second slip washer 194 can freely rotate about the shaft 160. As such no rotary movement can be transferred between the second slip washer 194 and the shaft 160. Therefore, all rotary movement between the driving gear 168 and the bevel gear 158 is transferred via the first slip washer 186 only.

The electric motor 12 rotatingly drives the driving gear 168, and the driving gear 168 can freely rotate about the shaft 160. As such, no rotary movement can be transferred to the shaft 160 directly from the driving gear 168. As the driving gear rotates, the ball bearings 184 located within the innermost set of holes 180 formed within the driving gear 168 also rotate with the driving gear 168. Under normal circumstances when the rotary movement is being transferred, the ball bearings 184 are held in the lowest point of the section of the trough 192 formed in the first slip washer 186 by the washer 176 which is biased downwardly by the biasing force of the belleville washer 178. The direction of rotation is such that the ball bearings 184 are pushed against the ramps of the trough 192, the ball bearings 184 being prevented from riding up the ramps by the biasing force of the belleville washer 178. As such, when the ball bearings 184 in the innermost set 180 rotate, the ramps and hence the first slip washer 186 also rotate. As the first slip washer 186 is non-rotatably mounted on the shaft 160 due to the splines 188 engaging the slot 190 in the shaft 160, as the first slip washer 186 rotates, so does the shaft 160 and hence the bevel gear 158. As such the rotary movement is transferred from the driving gear 168 to the bevel gear 158 via the ball bearings 184 in the innermost set of holes 180, the ramps and the first slip washer 186.

However, when a torque is applied to the clutch (in the form of a resistance to the turning movement of the bevel gear 158) above a certain amount, the amount of the force required to be transferred to from the ball bearings 184 to the ramps on the first slip washer 186 is greater than the force exerted by the belleville washer 178 on the ball bearings 184 keeping them in the lowest point of the section of the trough 192. Therefore, the ball bearings 184 ride over the ramps and then continue down the slope of the next section until it engages the next ramp. If the torque is still greater than the predetermined amount the process is repeated, the ball bearing 184 riding up the ramps against the biasing force of the belleville washer 178 and then rolling across the next section. As this happens the first slip washer 186 remains stationary and hence the shaft 160 and bevel gear 158 also remain stationary. Therefore, the rotary movement of the driving gear 168 is not transferred to the bevel gear 158.

Though the second slip washer 194 plays no part in transferring the rotary movement of the driving gear 168 to the shaft 160 in the low torque setting, it is nevertheless rotated by the driving gear 168.

The rod 214 is located in its highest position when the clutch is acting as a high torque clutch. When in this position, the pegs 220 are engaged with the rectangular aperture 200 in the second slip washer 194. As such, the second slip washer 194 is rotatably fixed to the shaft 160 via the pegs 220 located in the rectangular slot 200, the slots 222, 190 of the circular clip 204 and shaft 160. As such rotary movement can be transferred between the second slip washer 194 and the shaft 160. Therefore, rotary movement between the driving gear 168 and the bevel gear 158 can be transferred via the first slip washer 186 and/or the second slip washer 194.

The mechanism by which the driving gear 168 transfers its rotary motion to the first slip washer 186 via the ball bearings 184 and ramps is the same as that for the second slip washer 194.

The electric motor 12 rotatingly drives the driving gear 168 and the driving gear 168 can freely rotate about the shaft 160. As such, no rotary movement can be transferred to the shaft 160 directly from the driving gear 168. As the driving gear 168 rotates, the ball bearings 184 located within the innermost 180 and outermost 182 set of holes formed within the driving gear 168 also rotate with the driving gear 168. Under normal circumstances when the rotary movement is being transferred, the ball bearings 184 are held in the lowest points of the sections of the troughs formed in both the first slip washer 186 and the second slip washer 194 by the washer 176 which is biased downwardly by the biasing force of the belleville washer 178. The direction of rotation is such that the ball bearings 184 are pushed against the ramps of the troughs of both the first slip washer 186 and the second slip washer 194, the ball bearings 184 being prevented from riding up the ramps by the biasing force of the belleville washer 178. As such, when the ball bearings 184 rotate, the ramps and hence the first and second slip washers 186, 194 also rotate. As both the first and second slip washers 186, 194 are non-rotatably mounted on the shaft 160, as the first and second slip washers 186, 194 rotate, so does the shaft 160 and hence the bevel gear 158. As such the rotary movement is transferred from the driving gear 168 to the bevel gear 158 via the ball bearings 184 in the inner and outermost set of holes 180, 182, the ramps and the first and second slip washers 186, 194.

However, when a torque is applied to the clutch (in the form of a resistance to the turn movement of the bevel gear 158) above a certain amount, the amount of the force required to be transferred to from the ball bearings 184 to the ramps is greater than the force exerted by the belleville washer 178 on the ball bearings 184 keeping them in the lowest points of the sections of the troughs. The amount of torque required in the high torque setting is higher than that in the low torque setting. This is due to the size of the ramps between sections of the trough in the second slip washer 194 being greater than the size of the ramps between sections of the trough 192 in the first slip washer 186, requiring the belleville washer 178 to be compressed to a greater extent and hence requiring force for it to be done so. Therefore, when the force exceeds this greater value, the ball bearings 184 ride over the ramps and then continue down the slope of the next section until they engage the next ramp. If the torque is still greater than the predetermined value the process is repeated, the ball bearings 184 riding up the ramps against the biasing force of the belleville washer 178 and then rolling across the next section. As this happens the first and second slip washers 186, 194 remain stationary and hence the shaft 160 and bevel gear 158 also remain stationary. Therefore, the rotary movement of the driving gear 168 is not transferred to the bevel gear 158.

The mechanism by which the torque setting of the clutch is adjusted will now be described.

Figure 18:
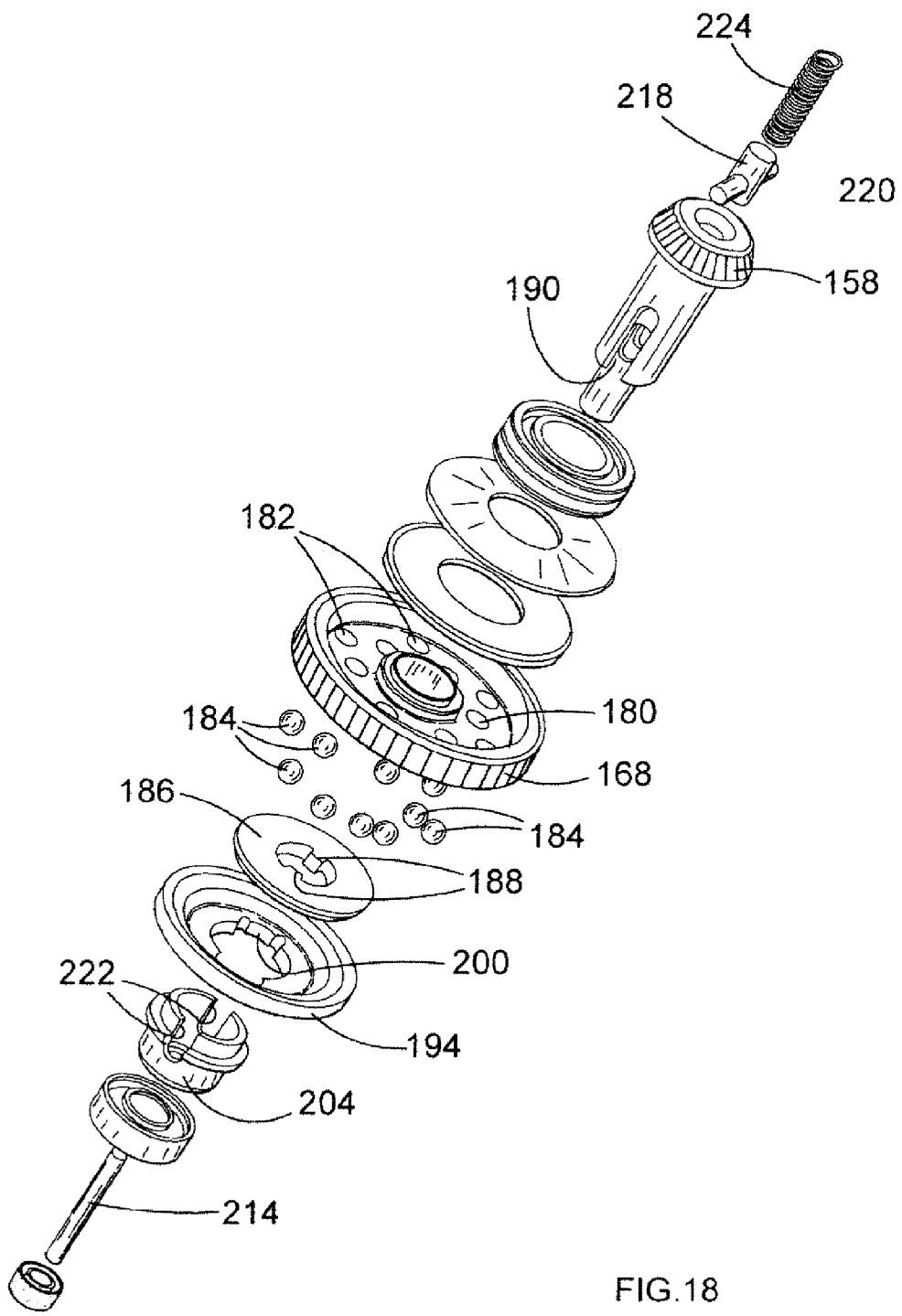
FIG. 18 is an exploded view of the clutch of FIG. 17.
Figure 19:
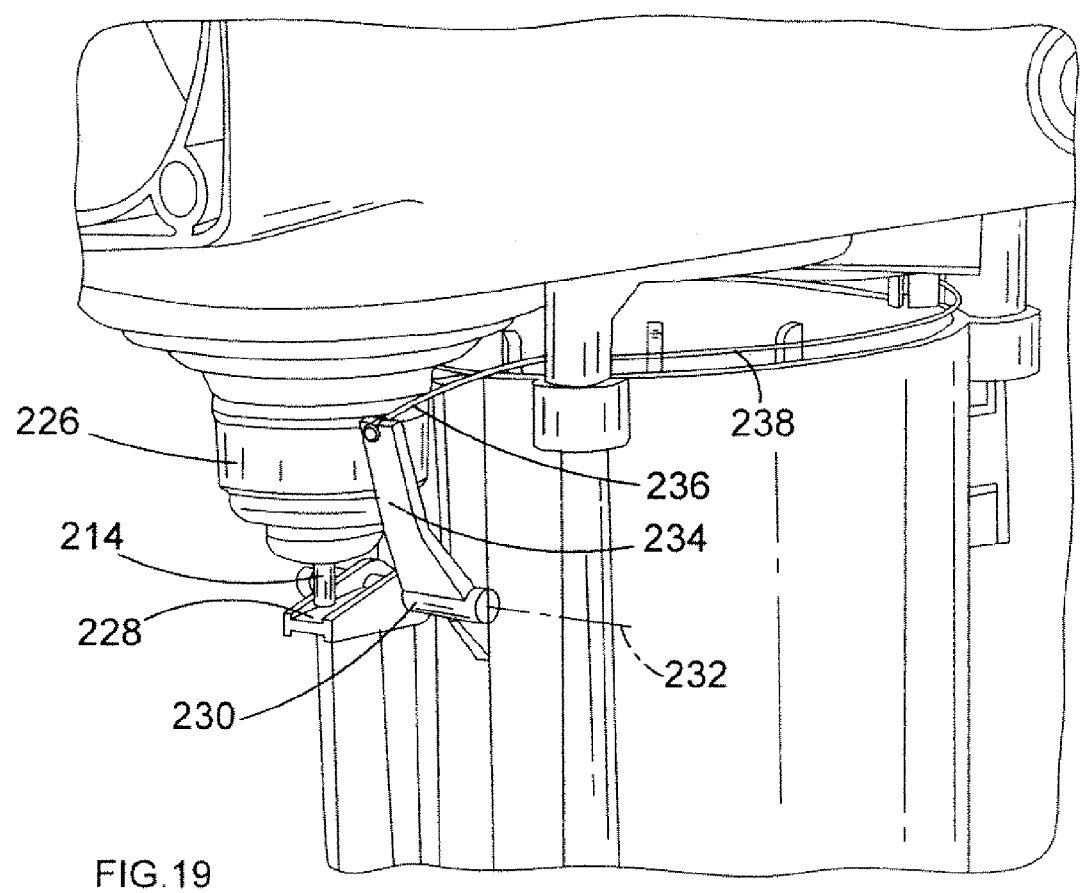
FIG. 19 is a perspective view of a torque change mechanism for the clutch of FIG. 18.

Referring to FIGS. 17 and 19, the underside of the two torque clutch is enclosed within a clutch housing 226. The rod 214 projects through the base of the housing 226. The lowest end of the rod 214 engages with a cam 228. The cam 228 is mounted on a shaft 230 which can pivot about its longitudinal axis 232. The rod 214 and hence the cam 228 are biased towards their lowest position by the spring 224 (FIG. 18) within the shaft 160 of the clutch. Pivotal movement of the shaft 230 results in a pivotal movement of the cam 228 which causes the end of the rod 214 slidably engaged with the cam 228 to ride up the cam 228 causing the rod 214 to slide vertically upwards against the biasing force of the spring 224 changing the clutch from the low torque to high torque setting.

Attached to shaft 230 is a flexible lever 234. Attached to the end of the flexible lever 234 is the cable 236 of a bowden cable 238. The pulling movement of the cable 236 pulls the lever 234 causing it and the shaft 230 to rotate about the axis 232. This results in the cam 228 pivoting which in turn moves the rod 214 vertically upwards. Release of the cable 236 allows the lever 234 and shaft 230 to pivot, allowing the cam 228 to move to its lowest position due to the biasing force of the spring 224 via the rod 214. The flexible lever 234 is sufficiently stiff to be able to move the shaft 230 and hence the cam 228 to change the torque setting of the clutch. However, it the two pegs 220 are not aligned with rectangular aperture on the second slip washer 194, the pegs 220 and hence the rod 214 is prevented from travelling to their uppermost position. However, the means by which the cable 236 is pulled will not be able to discern this. Therefore, in this situation, the lever 234 bends allowing the pegs 220 to abut the underside of the second slip washer 194 whilst allowing the cable 236 to be pulled by its maximum amount. When the motor 12 is energised, the second slip washer 194 will rotate, aligning the pegs 220 with the rectangular hole in the second slip washer 194, at which point the pegs 220 enter the rectangular hole due to the biasing force of the bent lever 234.

Figure 20:
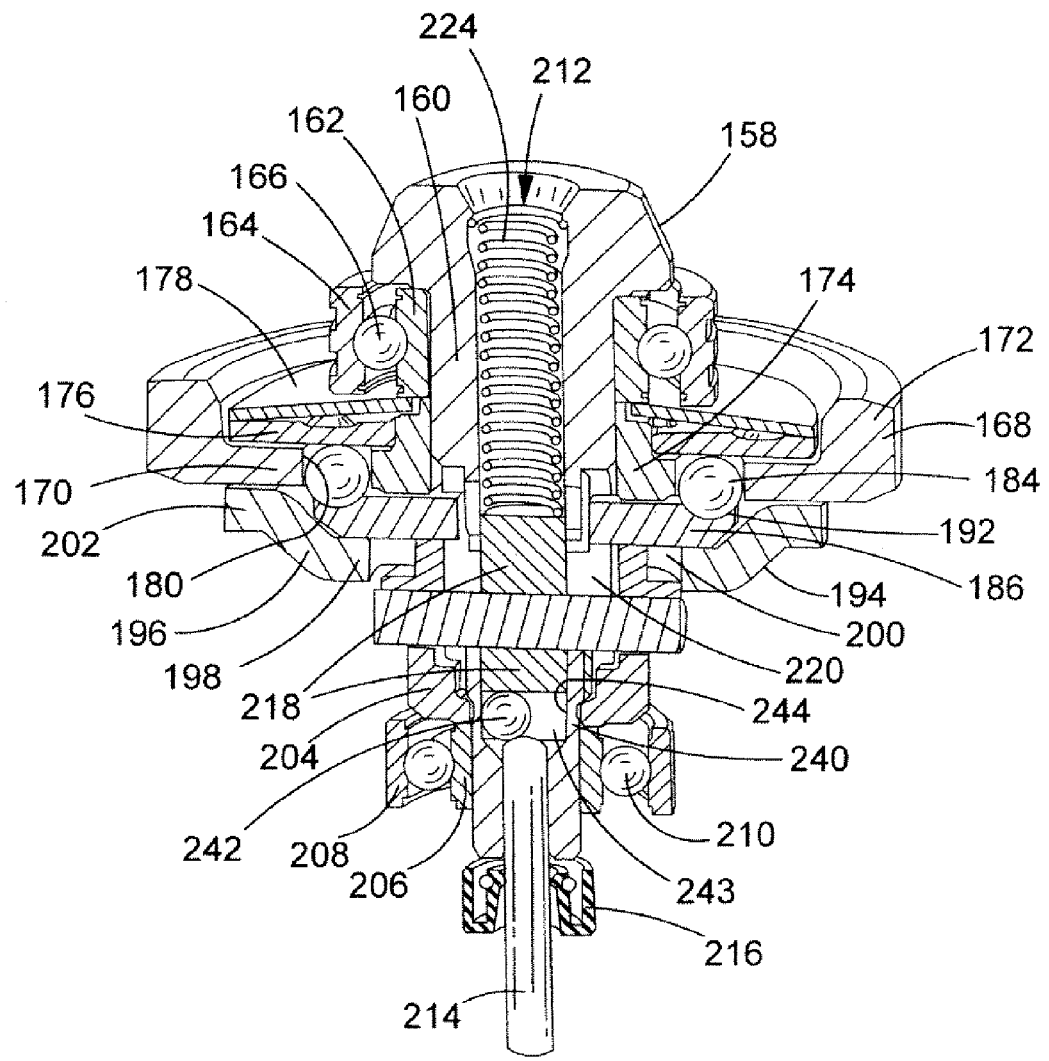
FIG. 20 is a side cross sectional view of a new design of overload clutch for use with the hammer drill of FIG. 1.

Referring to FIG. 20, a new design of clutch is described. The main difference to the design of the clutch previously described with reference to FIGS. 17 to 19 is the use of a ball bearing 242 sandwiched between the end of the shaft 214 and the sleeve 218. Where the same features are present, the same reference numbers are used. The shaft 214 extends into a tubular bearing housing 240 having an inner chamber 243 of circular cross section and in which is located a ball bearing 242 which is sandwiched between the end of the shaft 214 and the sleeve 218 and which is further arranged in a radially offset manner from the axis of rotation of the shaft 214 so that the axis of rotation of the shaft 214 does not pass through the centre of the ball bearing 242. This is achieved by ensuring that the diameter of the ball bearing 242 is less than the diameter of the chamber of the tubular bearing housing 240 and that the end of the shaft 214 is convex in shape in order to urge the ball bearing 242 towards the wall 244 of the chamber 243 of the tubular bearing housing 240 when the shaft is biased towards the sleeve 218.

In operation of the hammer drill, the shaft 214 is urged by the cam upwards towards the sleeve 218, sandwiching the ball bearing 242 between the end of the shaft 214 and the sleeve and urging the ball bearing 242 against the inner wall 244 of the chamber 243 of the ball bearing housing 240 due to the convex shape of the end of the shaft 214. As torque is transferred from the driving gear 168 via the overload clutch to the bevel gear 158, the bearing housing 240 mounted to the shaft 160 rotates relative to the end of the shaft 214, as a result of which the ball bearing 242 rotates in a generally circular path around the wall 244 of the chamber 243 of the ball bearing housing 240 and the convex end of the shaft 214, thus reducing wear at the end of the shaft 214.

Figure 21:
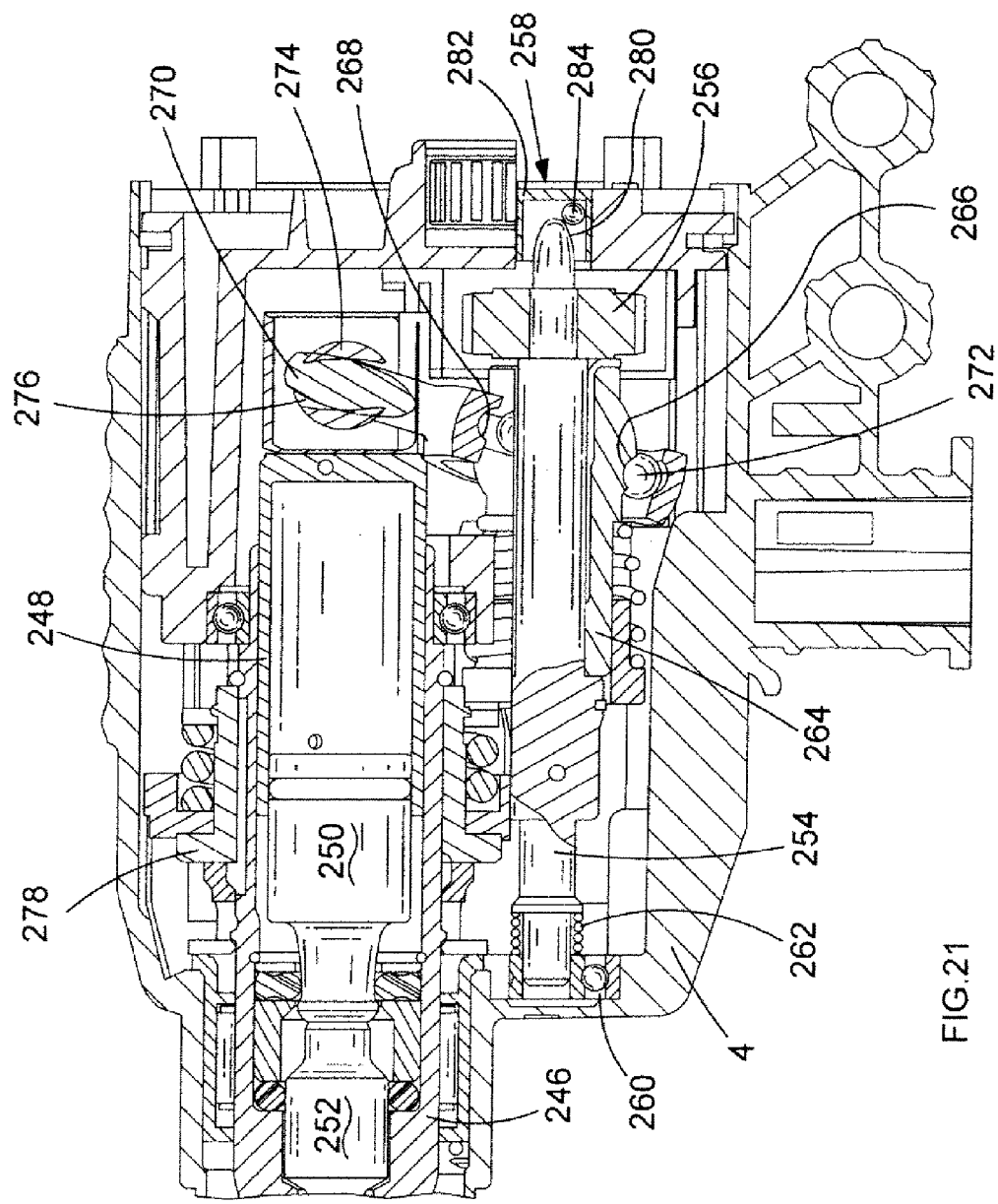
FIG. 21 is a side cross sectional view of a front part of a hammer drill.

Referring to FIG. 21, a side cross-sectional view of an alternative hammer drive mechanism and spindle drive mechanism of a hammer drill.

The hammer has a spindle 246 which is mounted for rotation within the hammer housing 4 as is conventional. Within the rear of the spindle 246 is slideably located a hollow piston 248 as is conventional. The hollow piston 248 is reciprocated within the spindle 246 by a hammer drive arrangement. A ram 250 follows the reciprocation of the piston 248 in the usual way due to successive under-pressures and over-pressures in an air cushion within the spindle 246 between the piston 248 and the ram 250. The reciprocation of the ram 250 causes the ram to repeatedly impact a beatpiece 252 which itself repeatedly impacts a tool or bit (not shown). The tool or bit is releasably secured to the hammer by a tool holder of conventional design, such as an SDS-Plus type tool holder, which enables the tool or bit to reciprocate within the tool holder to transfer the forward impact of the beatpiece 252 to a surface to be worked (such as a concrete block). The tool holder also transmits rotary drive from the spindle 246 to the tool or bit secured within it.

The hammer is driven by a motor (not shown), which has a pinion (not shown) which rotatingly drives an intermediate shaft 254 via a drive gear 256. The intermediate shaft 254 is mounted for rotation within the hammer housing 4, parallel to the hammer spindle 246 by means of a rearward bearing 258 (described in more detail below) and a forward bearing 260 of standard design. A spring 262 urges the intermediate shaft 254 rearwardly and is used to damp any reciprocatory motion which is transmitted to the intermediate shaft 254 via the wobble plate hammer drive arrangement described below. The intermediate shaft 254 has a driving gear (not shown) either integrally formed on it or press fitted onto it so that the driving gear rotates with the intermediate shaft 254. Thus, whenever power is supplied to the motor the driving gear rotates along with the intermediate shaft 254.

The hammer drive arrangement comprises a hammer drive sleeve 264 which is rotatably mounted on the intermediate shaft 254 and which has a wobble plate track 266 formed around it at an angle to the axis of the intermediate shaft 254. A wobble plate ring 268 from which extends a wobble pin 270 is mounted for rotation around the wobble track 266 via ball bearings 272 in the usual way. The end of the wobble pin 270 remote from the wobble ring 268 is mounted through an aperture in a trunnion 274 which trunnion is pivotally mounted to the rear end of the hollow piston 248 via two apertured arms 276. Thus, when the hammer drive sleeve 264 is rotatably driven about the intermediate shaft 254 the wobble plate drive reciprocatingly drives the hollow piston 248 in a conventional manner. The hammer drive sleeve 264 has a set of driven splines (not shown) provided at the forward end of the sleeve 264. The driven splines are selectively engageable with the intermediate shaft driving gear 50 via a mode change mechanism (not shown), the operation of which is not relevant to an understanding of the present invention and which will therefore not be described in further detail herein. When the intermediate shaft 254 is rotatably driven by the motor pinion and the mode change mechanism engages the driving splines of the hammer drive sleeve 264, the driving gear rotatably drives the hammer drive sleeve 264, the piston 248 is reciprocatingly driven by the wobble plate drive and a tool or bit mounted in the tool holder is repeatedly impacted by the beatpiece 252 via the action of the ram 250.

The spindle drive member comprises a spindle drive sleeve (not shown) which is mounted for rotation about the intermediate shaft 254. The spindle drive sleeve comprises a set of driving teeth at its forward end which are permanently in engagement with the teeth of a spindle drive gear 278. The spindle drive gear 278 is mounted non-rotatably on the spindle 246 via a drive ring which has a set of teeth provided on its internal circumferential surface which are permanently engaged with a set of drive teeth (not shown) provided on the outer cylindrical surface of the spindle 246. Thus, when the spindle drive sleeve is rotatably driven the spindle 246 is rotatably driven and this rotary drive is transferred to a tool or bit via the tool holder. The drive sleeve has a driven gear located at its rearward end which can be selectively driven by the intermediate shaft driving gear via the mode change mechanism.

The rear end of the intermediate shaft 254 has a convex surface 280, and the rear bearing 258 of the intermediate shaft 254 comprises a tubular bearing housing 282 forming a chamber of circular cross section for receiving the convex rear end 280 of the intermediate shaft 254. A ball bearing 284 is received in the chamber of the bearing housing 282 and is radially offset from the axis of rotation of the intermediate shaft 254 such that the axis of rotation of the intermediate shaft does not pass through the centre of the ball bearing 284. This is achieved by ensuring that the diameter of the ball bearing 284 is less than that of the chamber of the bearing housing 282. The ball bearing 284 is biased into engagement with the end 280 of the intermediate shaft by means of the spring 2262, which biases the intermediate shaft 254 rearwardly.

As a result of the bearing arrangement provided at the rear end of the intermediate shaft 254, construction of the hammer drill is simplified and made more compact, as a result of which its cost of manufacture is reduced, and wear at the end of the intermediate shaft 254 is reduced.

Referring to FIGS. 22 to 32, a hammer drill 288 of a further embodiment of the invention has a main housing 290 supporting a chuck 292 for receiving a drill bit (not shown), and a rear handle 294 moveably mounted to the main housing 290 in a manner which will be described in greater detail below. The handle 294 is formed from a first handle part 296 and a second handle part 298, which have respective mating profiles 300, 302 to define a chamber containing components 304 actuated by trigger 306 on the handle 294 to control the supply of electrical power to a motor (not shown) located in the main housing 290.

The mating profile 302 of the second handle part 298 has a larger radius of curvature (Arrow R1 in FIG. 37), when in an unstressed state, than the corresponding parts of the mating profile 300 of the first handle part 296 (Arrow R2 in FIG. 37), such that when the second handle part 298 is fixed to the first handle part 296 such that the first and second mating surfaces 300, 302 engage each other to close the chamber enclosed by the first and second handle parts 296, 298, the second handle part 298 is placed under bending stress. The bending stress is applied over substantially all of the second handle part 298, as a result of which vibrations transmitted from the main housing 290 to the handle 294 do not cause significant vibration of the second handle part 298.

The handle 294 is mounted to the main housing 290 by means of an upper mounting assembly 308, which enables the upper part of the handle 294 to slide relative to the upper part of the main housing 290, and a lower mounting assembly 310, which enables pivoting movement and limited linear movement of the lower part of the handle 294 relative to the lower part of the main housing 290. The gap between the upper part of the main housing 290 and the upper part of the handle 294 is closed by means of a compressible bellows 312, which will be described in greater detail below.

Figure 22:
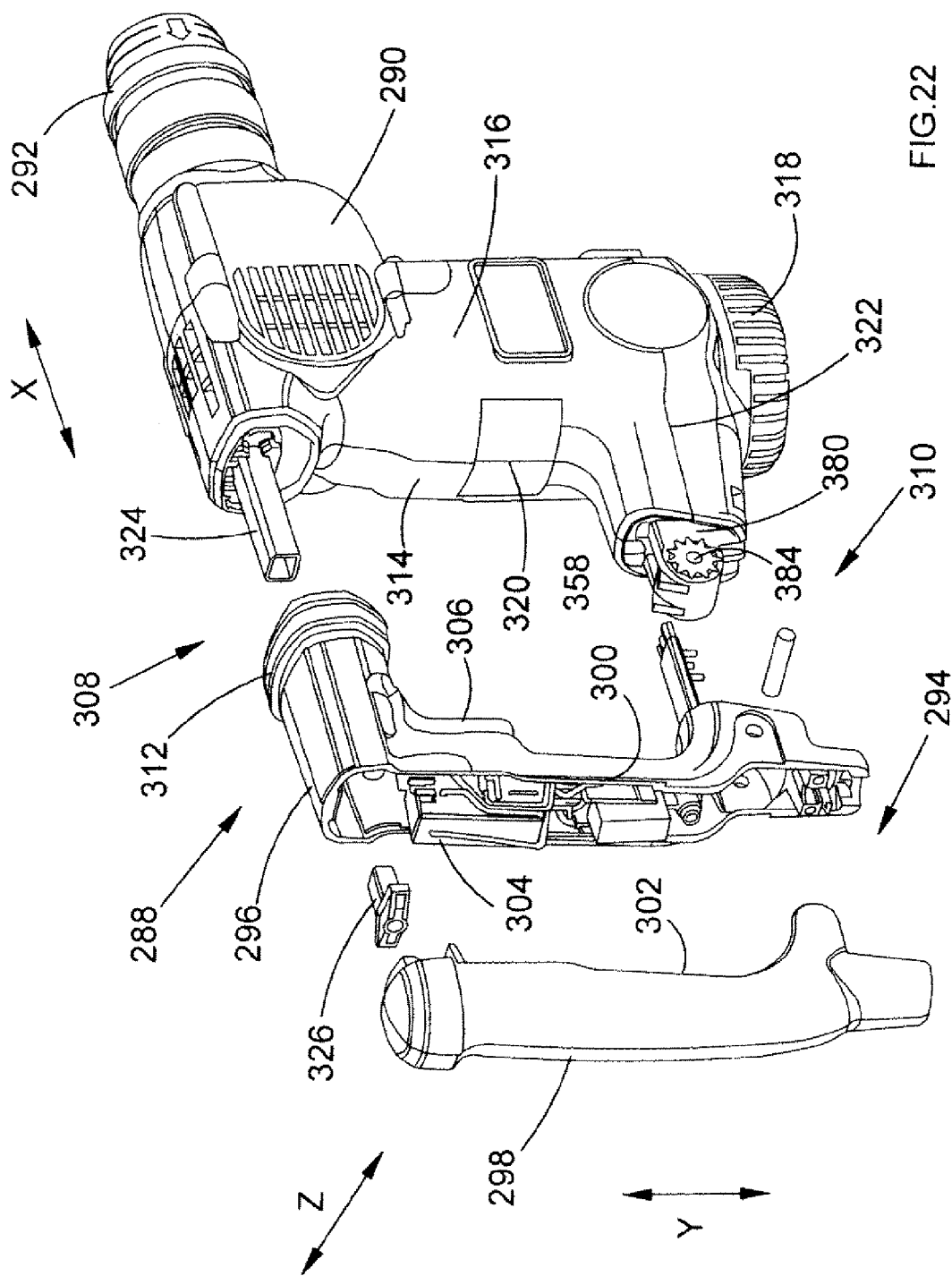
FIG. 22 is an exploded perspective view of a hammer drill of a further embodiment of the present invention.
Figure 23:
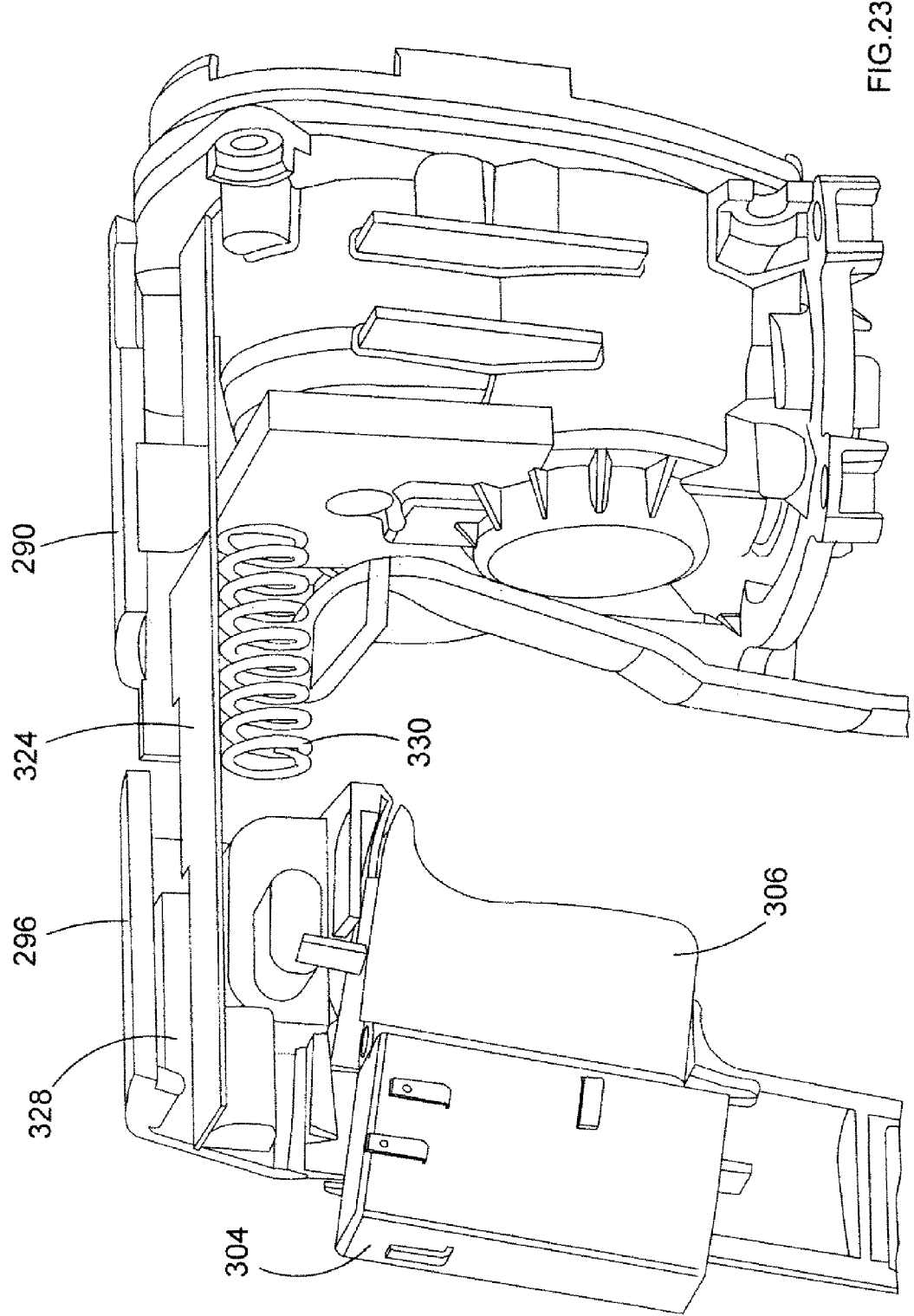
FIG. 23 is a detailed perspective cut away view of an upper part of the handle and housing of the hammer drill of FIG. 22.
Figure 24:
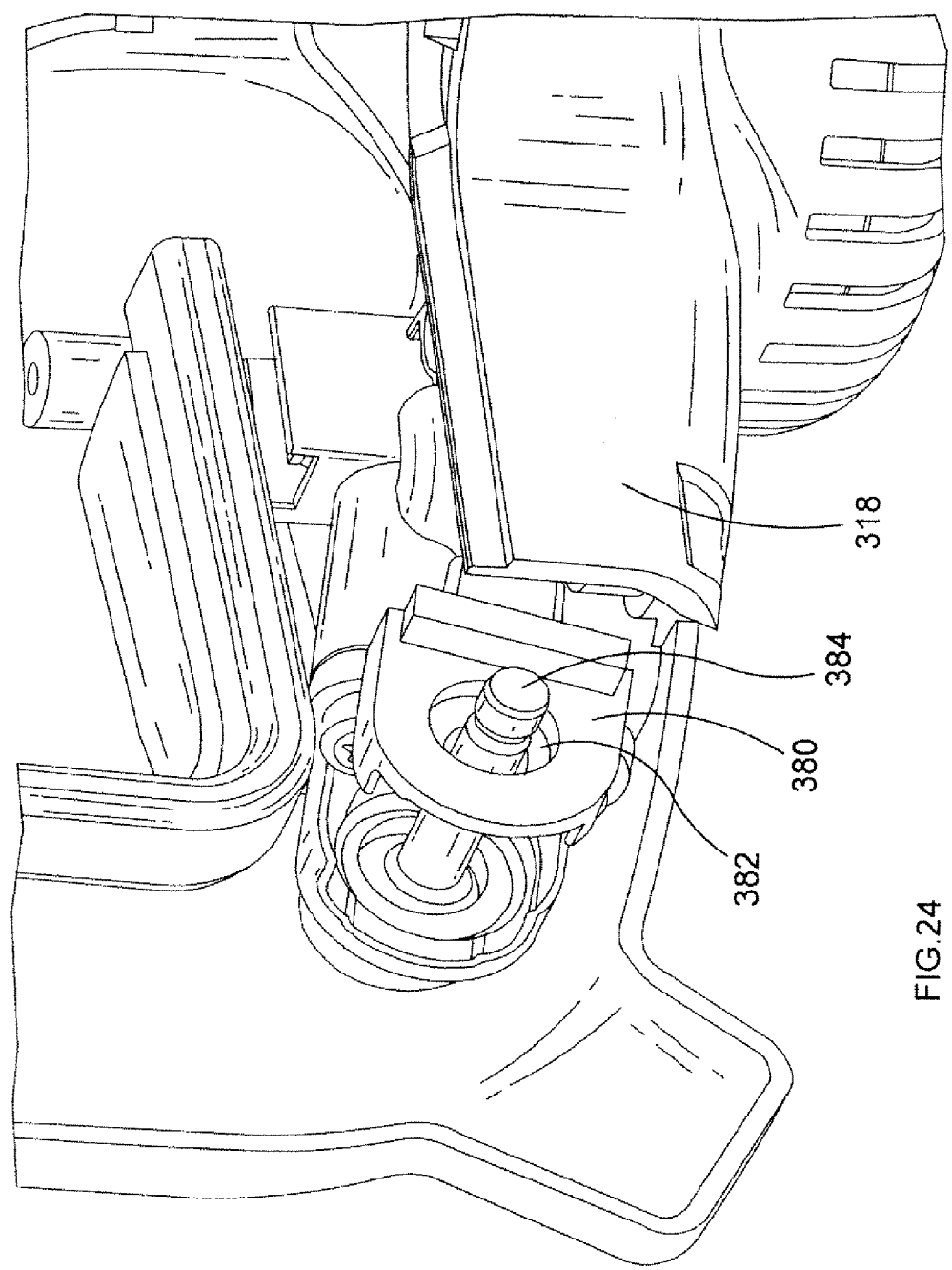
FIG. 24 is a detailed perspective cut away view of a lower part of the handle and housing of FIG. 22.

Referring in detail to FIGS. 22 to 24, the main housing 290 contains a motor and hammer mechanism which will be familiar to persons skilled in the art and which will not be described in greater detail herein. The main housing 290 is formed from three clam shells 314, 316, 318, which are screwed together. Two clam shells 314, 316 form the majority of the housing 290, and are connected together along a generally vertical plane 320. The third clam shell 318 is connected to the underside of the other two clam shells 314, 316 at a generally horizontal plane 322 to allow easy access to the underside of the motor.

The upper mounting assembly 308 has a rigid metal bar 324 connected to and extending from the rear part of the upper part of the main housing 290. The free end of the metal bar 324 extends into the upper part of the main housing 290, and is provided with a stop 326 which limits the extent to which the upper section of the handle 294 can move away from the main housing 290. The free end of the metal bar 324 is received within an elongate recess 328 formed in the upper section of the handle 294 so that the handle 294 can slide along the metal bar 324 towards and away from the main housing 290. A small gap is provided between the top surface of the metal bar 324 and the upper side of the elongate recess 328 within which it slides, and a small gap is formed between the bottom surface of the metal bar 324 and the lower side of the elongate recess 328. This allows sliding of the upper part of the handle 294 relative to the housing 290 while pivoting of the lower part of the handle 294 relative to the lower part of the main housing 290 occurs. A compression spring 330 biases the upper part of the handle 294 away from the main housing 290 towards engagement with the end stop 326 on the metal bar 324, and absorbs vibrations along the direction of the rotational axis of the spindle of the hammer drill 288.

Figure 30:
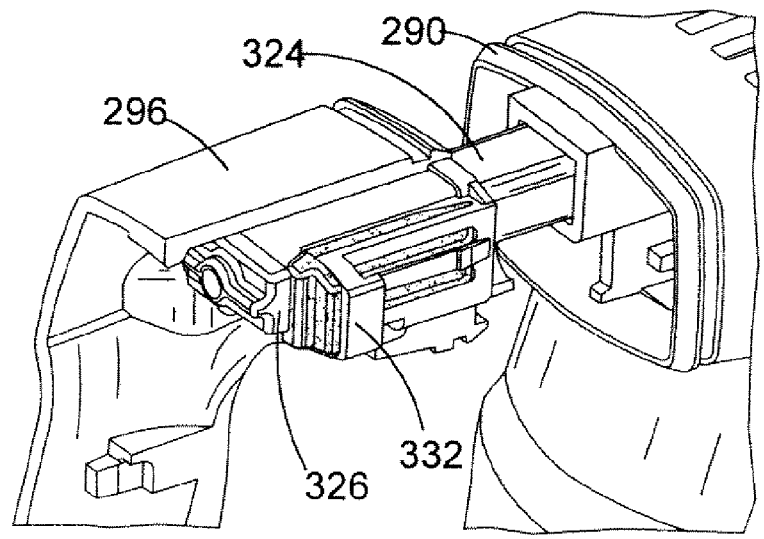
FIG. 30 is a partially cut away perspective view of a first embodiment of a vibration damping member and sliding bar of the hammer drill of FIG. 22.
Figure 31:
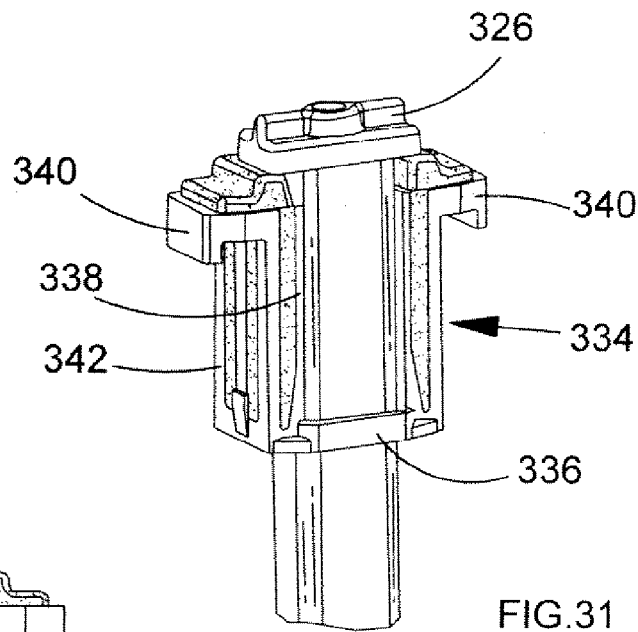
FIG. 31 is a perspective side view of the vibration damping member and sliding bar of FIG. 30.
Figure 32:
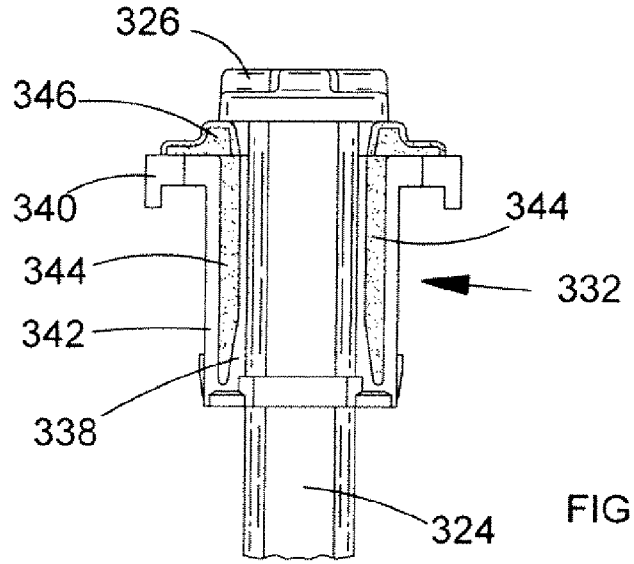
FIG. 32 is a side cross sectional view of the vibration damping member and sliding bar of FIG. 30.

Referring to FIGS. 30 to 32, a vibration damper 332 for damping vibrations in a horizontal direction at right angles to the longitudinal axis of the spindle of the hammer drill 288 (i.e. in the direction of arrow Z in FIG. 22) is mounted to the upper part of the handle 294 and is slidably mounted on the metal bar 324. The vibration damper 332 has a body portion 334 of hard plastics material defining a hoop 336 slidably mounted around the metal bar 324, a sliding inner side wall 338 of hard plastics material extending along each side of the metal bar 324, and outer lugs 340 which are attached to respective side walls of the upper part of the first handle part 296. Each of the lugs 340 is connected to an outer side wall 342 of hard plastics material which extends along part of the length of the metal bar 324 such that the outer side walls 342 can pivot or otherwise move relative to the sliding inner side walls 338. A wedge shaped compressible member 344 of resilient material is sandwiched between the inner side walls 338 and the outer side walls 342, such that compression or expansion of the wedge shaped compressible member 344 occurs as the metal bar 324 moves in the direction of the arrow Z in FIG. 22 relative to the upper part of the handle 290.

It can also be seen that a further piece 346 of compressible material is provided on an end wall of the outer lugs 340 to damp transmission of vibrations from the end stop 326 on the metal bar 324 to the lugs 340, and therefore to the handle 290, when the vibration damper 332 is in engagement with the end stop 326 at the outermost position of the handle 294 relative to the main body 290. Vibrations can also be damped by means of a spring (not shown), instead of or in addition to the wedged shaped compressible members 344, located between the inner and outer side walls 338, 342.

Figure 36:
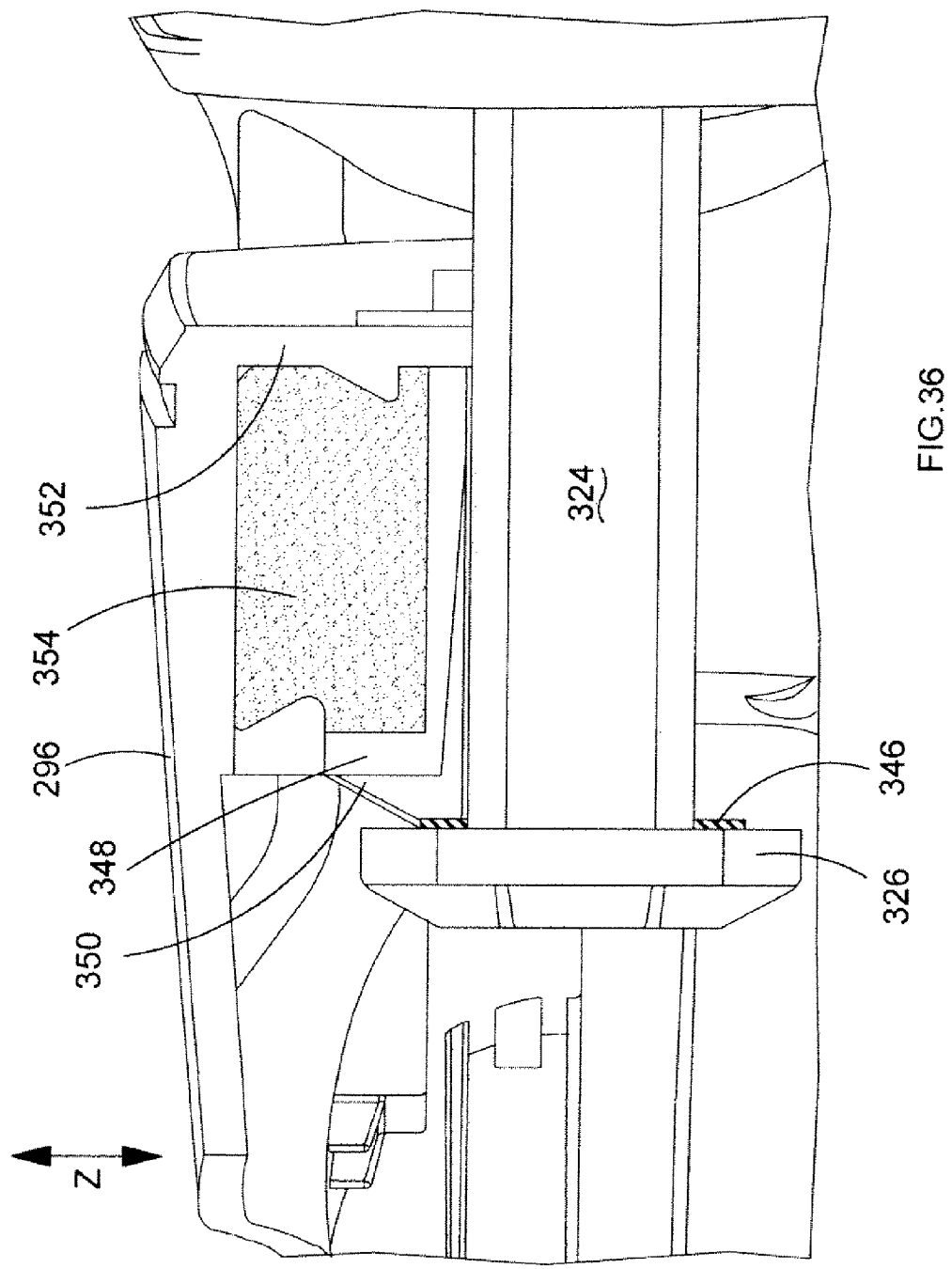
FIG. 36 is a schematic view of a further embodiment of a vibration damping member and sliding bar of the hammer drill of FIG. 22.
Figure 38:
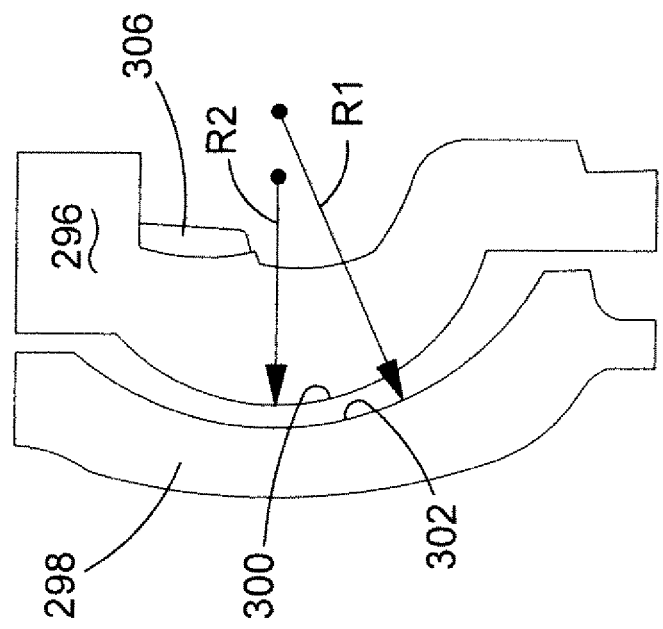
FIG. 38 is schematic view of the rear handle shown in FIG. 22.
Figure 37:
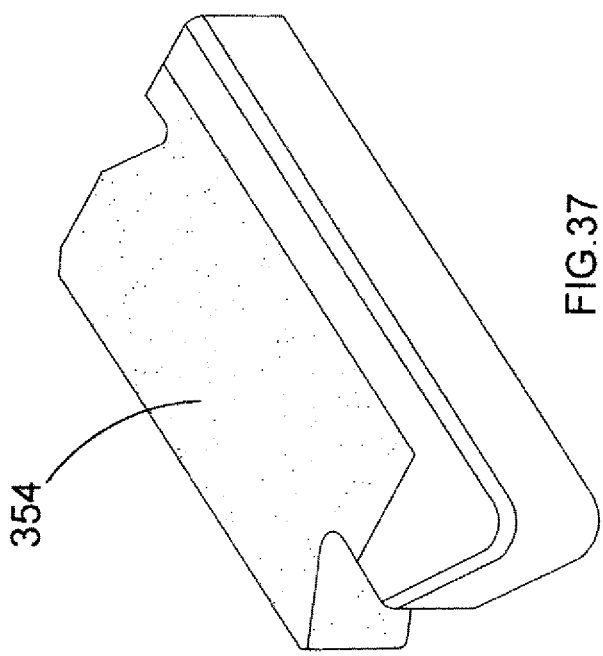
FIG. 37 is a schematic view of a compressible vibration damping member of FIG. 36.

FIGS. 36 and 37 show an alternative embodiment of vibration damping mechanism for use in the upper part of the handle 294 of the hammer drill 288 of FIG. 22. A vibration damper 348 is slidably mounted to the metal bar 324 and has inner side walls 350 and outer side walls 352 which can slide relative to each other as movement of the metal bar 324 relative to the first handle part 296 occurs in the direction of arrow Z in FIG. 36. A block 354 of compressible resilient material is located between the inner and outer side walls 350, 352 to dampen vibrations arising as a result of relative movement in the direction of arrow Z. The inner and outer side walls 350, 352 can slide relative to each other along two orthogonal directions (i.e. parallel to the direction of arrow Z, and parallel to the longitudinal axis of the metal bar 324), to accommodate rotation of the metal bar 324 relative to the handle 294. Resilient members 346 are provided on the end stop 326 to damp vibrations transmitted from the metal bar 324 to the handle 294 when the vibration damper 348 engages the end stop 326. A further vibration damper 348 (not shown) identical to that shown in FIG. 36 is provided on the opposite side of the metal bar 324.

Figure 27:
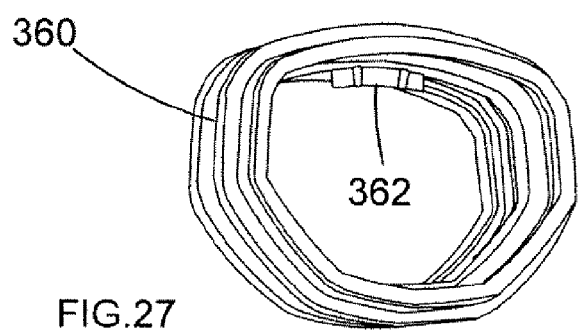
FIG. 27 is a perspective view of a bellows for use in the hammer drill of FIG. 22.
Figure 28:
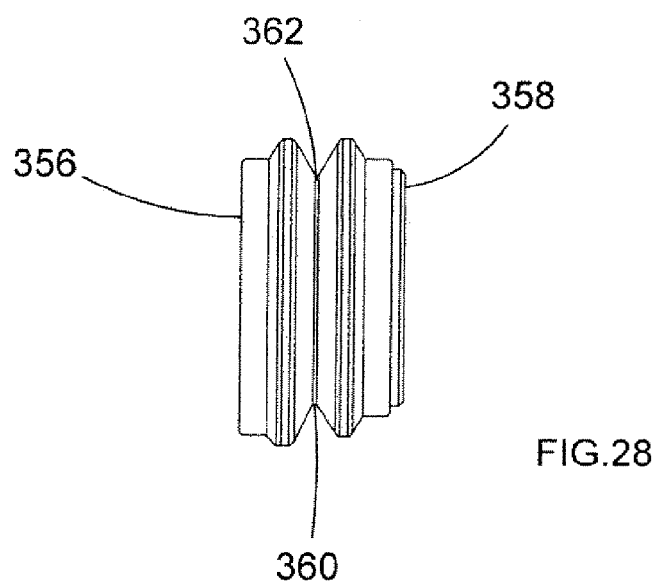
FIG. 28 is a side view of the bellows of FIG. 27.
Figure 29:
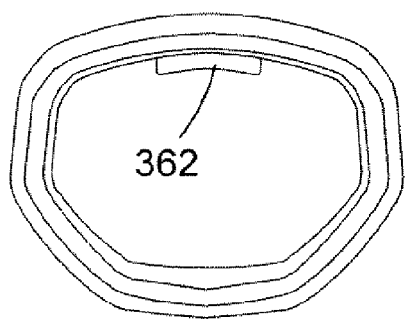
FIG. 29 is an end view of the bellows of FIG. 27.

As shown in FIGS. 27 to 29, the bellows 312 joining the upper part of the handle 294 to the upper part of the main housing 290 is formed from durable plastics material and has a first mounting part 356 for mounting to the handle 294, and a second mounting part 358 for mounting to the housing 290. The first and second mounting parts 356, 358 are connected by a compressible part 360 formed from pleated plastics material, and is provided with a compressible elastomeric member 362 between one or more pairs of adjacent pleats. In this way, as the upper part of the handle 294 is pushed towards the upper part of the main housing 290 towards its position of closest proximity to the main housing 290, the vibrations transmitted from the hard plastic second mounting part 358 attached to the housing 290 to the hard plastic first mounting part 356 mounted to the handle 294 are damped as the first and second mounting parts 356, 358 move closer together.

Figure 33:
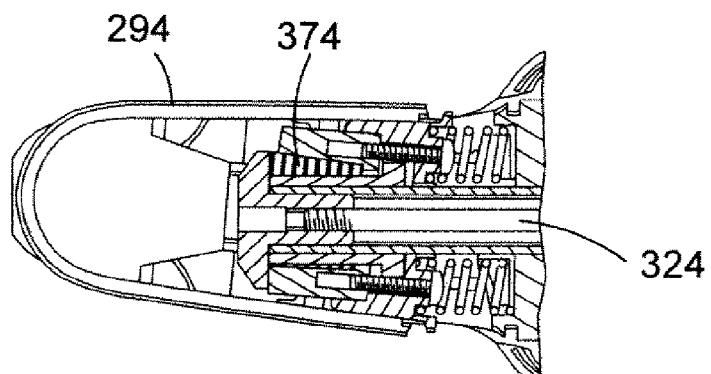
FIG. 33 is a cross sectional plan view of a further embodiment of the tool handle and part of the tool housing of the hammer drill of FIG. 22 when twisted towards one direction.
Figure 34:
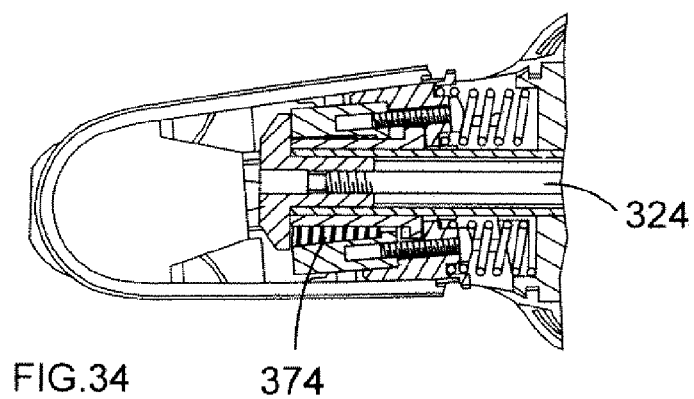
FIG. 34 is a view corresponding to FIG. 33 when twisted towards the opposite direction to FIG. 33.
Figure 35:
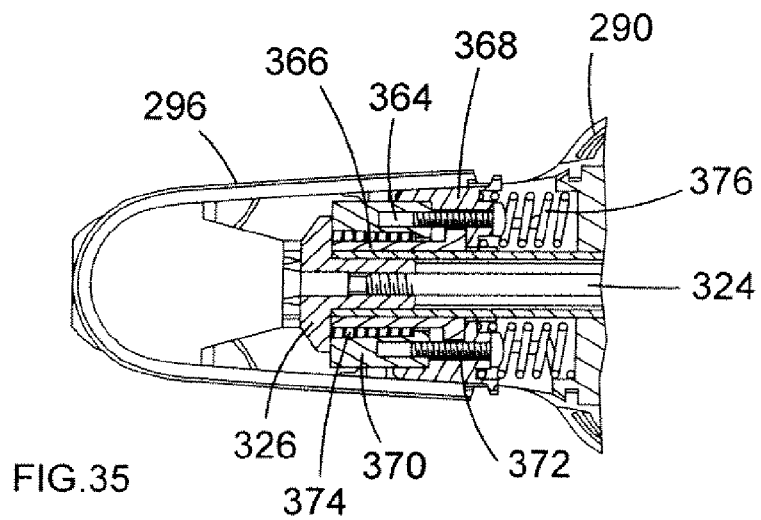
FIG. 35 is a view corresponding to FIG. 33 when in an untwisted state.

An alternative design of an arrangement for damping vibrations of the handle 294 in the Z direction is shown in FIGS. 33 to 35. Referring firstly to FIG. 35, a vibration damper 364 is located on each side of the metal bar 324 between the metal bar 324 and an internal surface of the first handle part 296, and has a sliding part 366 of durable plastics material slidably mounted to the metal bar 324, and outer tugs 368 rigidly mounted to the first handle part 296. Outer walls 370 are rigidly fixed to the lugs 368 by means of screws 372 in such a way that the outer walls 370 and lugs 368 can pivot together relative to the sliding parts 366, and a wedged-shaped member 374 of compressible resilient material is sandwiched between each sliding part 366 and the corresponding outer wall 370. A compression spring 376 mounted to the housing 290 biases each outer wall 370 and the corresponding lug 368 towards the end stop 326 at the end of the metal bar 324.

Twisting of the handle 294 about a vertical axis generally parallel to the longitudinal axis of the handle 294 causes compression of the elastomeric member 374 on one side of the metal bar 324 and expansion of the elastomeric member 374 on the other side. In this way, torsional vibrations about the vertical axis are damped.

Figure 25:
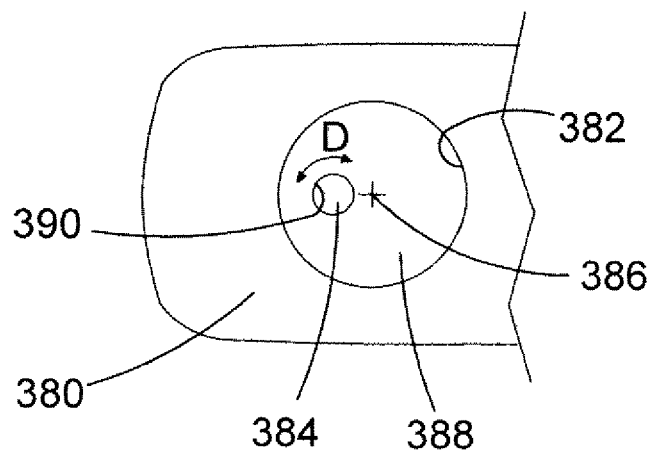
FIG. 25 is a schematic view of the pivot pin and deformable member of the lower part of the handle and housing of FIG. 24 in a relaxed state.
Figure 26:
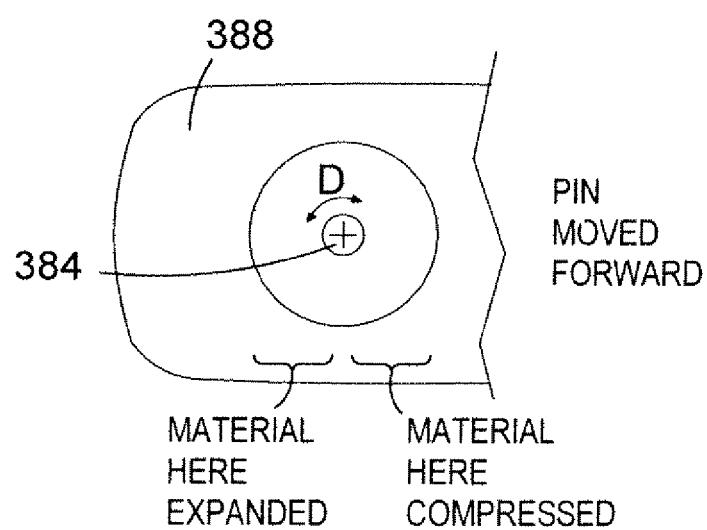
FIG. 26 is a schematic view, corresponding to FIG. 25 of the lower parts of the housing when force is applied to the handle of the tool during use.

Referring to FIGS. 24 to 26, the lower mounting assembly 310 connecting the lower part of the handle 294 to the lower part of the main housing 290 will now be described.

The third clam shell 318 has a pair of inner walls 380, each of which is provided with a generally circular aperture 382, the circular apertures 382 being aligned with each other along a horizontal axis. The lower part of the handle 294 surrounds the circular apertures 382, and a pivot pin 384 extends between the inner side walls of the lower section of the handle 294 across the width of the lower section of the handle and passes through the two circular apertures 382 to define a pivot axis for pivoting movement of the lower part of the handle 294 relative to the lower part of the housing 290, the pivot axis being generally parallel to the central axes 386 of the circular apertures 382.

A resilient member 388 is located between the inner periphery of each aperture 382 and the pivot pin 384, the resilient member 388 having a generally circular outer periphery to fit the inner periphery of the aperture 382 and an aperture 390 for receiving the pivot pin 384 and which is generally offset from the centre of the resilient member. The position of the pivot pin 384 when inserted through the aperture 390 in the resilient member 388 can be adjusted by applying a force to the lower part of the handle 294 to push the lower part of the handle 294 towards the main housing 290, to cause compression of the resilient material of the resilient member 388 forwards of the pivot pin 384, and expansion of the resilient material behind the pivot pin 384. The pivot pin 384 can freely rotate within the aperture 390 in the resilient member 388.

Referring to FIG. 25, when no force is applied to the handle 294, the pivot pin 384 is biased by the resilient material of the resilient members 388 to the position shown in FIG. 25 such that the longitudinal axis of the pivot pin 384 is located to the rear of the longitudinal axes 386 of the two apertures 362. When the hammer drill is in operation, however, a force is applied to the handle 294, which urges the lower part of the handle 294 towards the main housing 290. This causes the pivot pin 384 to move forwards relative to the apertures 362, and the longitudinal axis of the pin 384 moves towards the longitudinal axes 386 of the apertures 362. The spring force of the resilient material is chosen such that when the operator applies a typical force to the handle 294 during operation of the hammer drill, the longitudinal axis of the pin 384 is aligned with or located close to the longitudinal axes 386 of the apertures 362 to maximise the vibration damping effect of the resilient members 388.

During operation of the hammer drill 288, the operator applies a force on the handle 294 to push the drill bit (not shown) of the drill against a workpiece. Since the major component of the force is applied along the working axis of the drill, i.e. the longitudinal axis of the spindle of the drill, the upper section of the handle 294 slides along the metal bar 324 and compresses the spring 330, while also causing the pin 384 in the lower part of the handle 294 to move forwards towards the central axes 386 of the apertures 362, as shown in FIG. 26. The upper section of the handle 294 moves more than the lower section, as a result of which the handle 294 pivots relative to the main housing 290. This pivotal movement is accommodated because the pin 384 can pivot in the direction of arrow D shown in FIGS. 25 and 26 relative to the resilient members 388.

As a result of the operation of the tool, vibrations are generated primarily in the direction of arrow X in FIG. 22, but are also generated along the two axes orthogonal to the direction of arrow X. The vibrations in the direction of arrow X are predominately absorbed by the upper mounting assembly 308, since it is closer to the axis of travel of the ram, beat piece and cutting tool, the absorption occurring as a result of the metal bar 324 sliding in and out of the elongate recess 328 and compressing and expanding the spring 330. However, vibrations in the direction of arrow X are also absorbed by the resilient members 388 in the tower mounting assembly 310 by movement of the pin 384 sideways in the horizontal direction within the apertures 362. Since more movement in the direction of arrow X occurs at the top of the handle 294, this is accommodated by the pin 384 pivoting in the resilient members 388.

Vibrations in the direction of arrow Y in FIG. 22 are absorbed by the lower mounting 310 arrangement by means of the resilient members 388 being compressed and expanded as the pin 384 moves vertically within the apertures 362. The small gaps between the metal bar 324 and the upper and lower sides of the elongate recess 328 allow for movement of the metal bar 324 in the direction of arrow Y. The vibrations in the direction of arrow Z are absorbed by means of the vibration dampers 332 mounted to both sides of the metal bar 324.

It will be appreciated by persons skilled in the art that the above embodiments have been described by way of example only, and not in any limitative sense, and that various alterations and modifications are possible without departure from the scope of the invention as defined by the appended claims.

The invention claimed is:

1. A mounting assembly for moveably mounting a handle of a power tool to a housing of the power tool, the assembly comprising:
    a first mounting member adapted to be mounted to one of the housing of the power tool and the handle of the power tool;
    a second mounting member adapted to be mounted to the other of the housing of the power tool and the handle of the power tool and to slidably engage the first mounting member to enable movement of the first mounting member relative to the second mounting member along a sliding axis; and
    at least one first vibration damping member, the at least one dampening member comprising at least one first resilient member disposed around the first mounting member and a sliding portion dispose adjacent the first mounting member; and
    wherein the at least one first resilient member is compressed in a Z direction when the first mounting member pivots relative to the second mounting member about an axis substantially parallel to a longitudinal axis of the handle.

2. An assembly according to claim 1, wherein said first mounting member comprises an elongate bar.

3. An assembly according to claim 2, wherein said at least one first resilient members is tapered.

4. An assembly according to claim 3, wherein said second mounting member further comprises at least one mounting portion adapted to be mounted to one of the handle and the tool housing, such that pivoting of the first mounting member relative to the second mounting member about an axis substantially parallel to at least one of the sliding axis and an axis substantially parallel to a longitudinal axis of the handle causes movement of the at least one mounting portion relative to the corresponding sliding portion to cause compression and/or expansion of at least one said first resilient member.

5. An assembly according to claim 4, wherein said at least one mounting portion is adapted to pivot relative to the corresponding sliding portion.

6. An assembly according to claim 4, wherein said at least one mounting portion is adapted to slide relative to the corresponding sliding portion.

7. An assembly according to claim 4, wherein said at least one first resilient member is adapted to be located between a respective at least one mounting portion and the corresponding sliding portion.

8. An assembly according to claim 7, wherein said at least one mounting portion is adapted to pivot relative to the corresponding sliding portion.

9. An assembly according to claim 8, wherein said at least one mounting portion is adapted to slide relative to the corresponding sliding portion.

10. An assembly according to claim 2, wherein said first mounting member further comprises a stop member for limiting movement of the handle of the tool away from the housing of the tool.

11. An assembly according to claim 10, further comprising at least one second resilient member adapted to be located between said stop member and said second mounting member when said second mounting member engages said stop member.

12. A tool according to claim 10, further comprising biasing means for biasing the second mounting member towards engagement with the stop member.

13. An assembly according to claim 1, wherein the handle is a rear handle.

14. An assembly according to claim 1, wherein the sliding axis and the longitudinal axis of the handle are substantially perpendicular to each other.

15. A power tool comprising:
    a housing;
    a handle adapted to be gripped by a user and moveably mounted to the housing; and
    at least one mounting assembly according to claim 1.

* * * * *